(12) United States Patent
Li et al.

(10) Patent No.: US 11,641,432 B2
(45) Date of Patent: May 2, 2023

(54) NON-TRANSITORY COMPUTER-READABLE RECORDING MEDIUM FOR GENERATING IMAGE DATA

(71) Applicant: Brother Kogyo Kabushiki Kaisha, Nagoya (JP)

(72) Inventors: Lei Li, Iwakura (JP); Kenju Narita, Nagoya (JP); Hiroya Nojiri, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/644,358

(22) Filed: Dec. 15, 2021

(65) Prior Publication Data

US 2022/0109764 A1 Apr. 7, 2022

Related U.S. Application Data

(63) Continuation of application No. PCT/JP2020/010833, filed on Mar. 12, 2020.

(30) Foreign Application Priority Data

Jun. 28, 2019 (JP) .............................. JP2019-121041

(51) Int. Cl.
*H04N 1/00* (2006.01)

(52) U.S. Cl.
CPC ..... *H04N 1/00456* (2013.01); *H04N 1/00453* (2013.01); *H04N 2201/0094* (2013.01)

(58) Field of Classification Search
CPC ........... H04N 1/00456; H04N 1/00453; H04N 2201/0094; H04N 1/00; H04N 1/387; B41J 21/00; G06F 3/12

USPC .......................................................... 358/1.15
See application file for complete search history.

(56) References Cited

U.S. PATENT DOCUMENTS

| 2009/0303551 A1 | 12/2009 | Okada |
| 2016/0260460 A1* | 9/2016 | Abe ........................ G06V 20/35 |

FOREIGN PATENT DOCUMENTS

| JP | 2001-157035 A | 6/2001 |
| JP | 2008-092133 A | 4/2008 |
| JP | 2009-296409 A | 12/2009 |
| JP | 2014-230132 A | 12/2014 |

(Continued)

OTHER PUBLICATIONS

International Search Report (with English translation) and Written Opinion, International Application No. PCT/JP2020/010833, dated May 26, 2020 (5 pages).

(Continued)

*Primary Examiner* — Neil R Mclean
(74) *Attorney, Agent, or Firm* — Burr Patent Law, PLLC

(57) ABSTRACT

A program implemented in an information processing device obtains a plurality of pieces of image data and an area size of an arrangement area. When images indicated by the plurality of pieces of image data are arranged within the arrangement area and when the obtained images are arranged, the program determines whether the images are appropriately arranged, and, in response to determining that the images are arranged appropriately, arranges the images. Then, the program generates arranged image data representing the plurality of arranged images arranged in the arrangement area.

18 Claims, 19 Drawing Sheets

(56) References Cited

FOREIGN PATENT DOCUMENTS

JP 2014230132 A * 12/2014

OTHER PUBLICATIONS

English translation of the International Preliminary Report on Patentability (Chapter I) dated Jan. 6, 2022 (Application No. PCT/JP2020/010833).

* cited by examiner

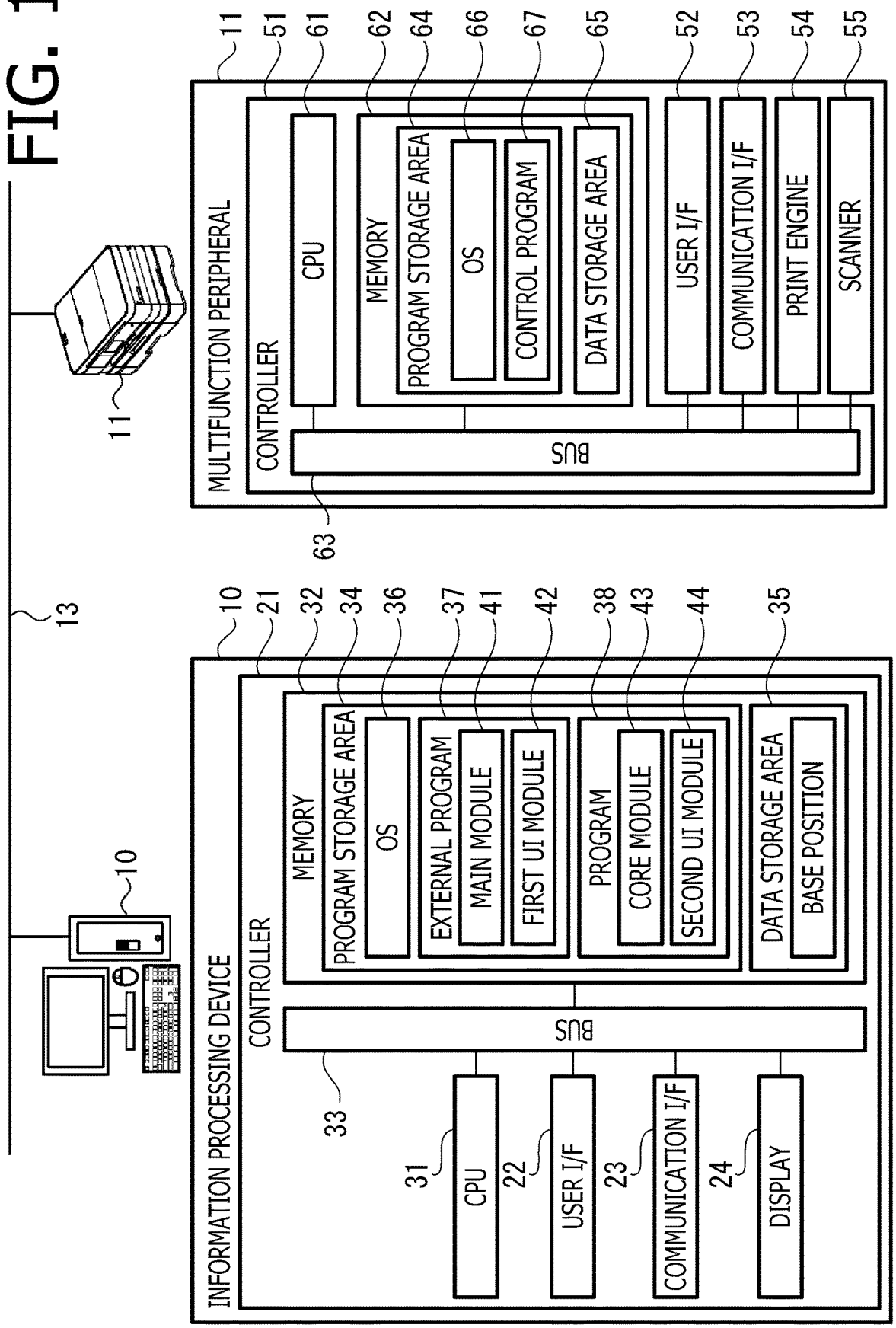

NON-TRANSITORY COMPUTER-READABLE RECORDING MEDIUM FOR GENERATING IMAGE DATA

CROSS-REFERENCE TO RELATED APPLICATIONS

This is a Continuation Application of International Application No. PCT/JP2020/010833 filed on Mar. 12, 2020, which claims priority from Japanese Patent Application No. 2019-121041 filed on Jun. 28, 2019. The entire disclosures of the prior applications are incorporated herein by reference.

BACKGROUND

The present disclosures relate to a technique for generating arranged image data in which multiple images are arranged.

There has been known an image forming device equipped with a document reader, an operation panel, and a control unit. The operation panel is configured to receive a selection of an Nin1 (e.g., 2in1 and 4in1) printing and setting of a size of a recording sheet. The document reader reads an image recorded on a document to generate image data, and outputs the generated image data. When 2in1 is selected, the control unit places the two images indicated by the two pieces of image data in equally divided areas of a selected recording sheet, respectively, to generate an arranged image that contains the two images.

SUMMARY

According to the conventional art described above, however, the "Nin1" process is a process of generating image data in which N images designated by the user are arranged in equally divided N areas of a page. According to the conventional art, images are arranged only in equally divided areas, respectively.

According to aspects of the present disclosure, a non-transitory computer-readable recording medium for an information processing device which includes a memory and a computer contains computer-executable instructions which cause, when executed by the computer, the information processing device to perform a first obtaining process of obtaining a plurality of pieces of image data, and a second obtaining process of obtaining an area size from an external program, the area size being a size of an arrangement area in which obtained images represented by the obtained plurality of pieces of image data are to be arranged. When the obtained images are arranged without overlapping arranged images which are the obtained images having already been arranged within the arrangement area and when the obtained images are arranged, with respect to the arranged images, in a first arrangement direction stored in the memory, the information processing device can perform a first determining process of determining whether the obtained images to be arranged within the arrangement area are appropriately arranged. Further, in response to determining, in the first determining process, that the obtained images are arranged appropriately, the information processing device can perform a first arranging process of arranging the obtained images in the first direction with respect to the arranged images without overlapping the arranged images, and generating process of generating arranged image data representing the plurality of arranged images arranged in the arrangement area.

BRIEF DESCRIPTION OF THE DRAWINGS

FIG. 1 is a functional block diagram of an information processing device and an MFP (multifunction peripheral) according to a present embodiment.

DETAILED DESCRIPTION OF THE EMBODIMENT

Figure 2A:
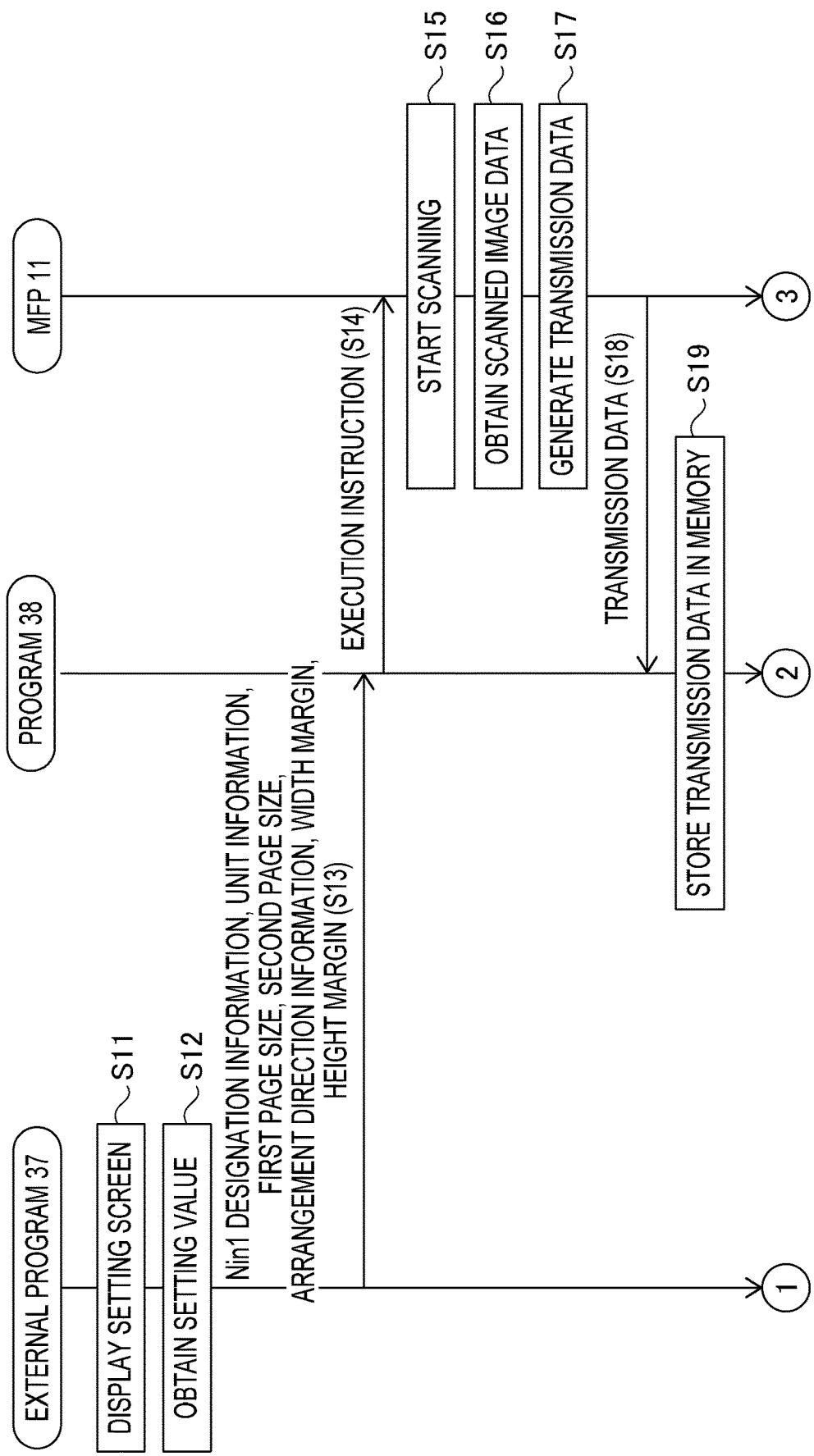
FIGS. 2A and 2B illustrate processes executed by an external program, a program of the information processing device, and a control program of the MFP.

Hereinafter, an embodiment according to the present disclosures will be described. It is noted that the embodiment described below is only an example according to the present disclosures, and the embodiment according to the present disclosures can be appropriately modified, as far as the aspects of the present disclosures are not changed. For example, the order of processes described later can be appropriately changed to the extent that aspects of the present disclosures are not changed. Alternatively, part of the processes described later may be appropriately omitted to the extent that aspects of the present disclosures are not changed.

In the present embodiment, a program 38 that is implemented in an information processing device 10 shown in FIG. 1 will be described. The information processing device 10 is a personal computer, a tablet, a mobile terminal, or the like, and has a function of communicating with a multifunction peripheral 11. The multifunction peripheral 11 has a scanning function and a communication function. The multifunction peripheral 11 is configured to scan a plurality of documents such as sales slips and receipts, according to instructions input from the information processing device 10, and generates a plurality of pieces of image data. The multifunction peripheral 11 then transmits the generated plurality of pieces of image data to the information processing device 10. A program 38 implemented in the information processing device 10 arranges the plurality of images represented by the plurality of pieces of image data transmitted by the multifunction peripheral 11 on a page to generate an arranged image data. The arranged image data generated by the program 38 is submitted to, for example, a customs agency or the like. A configuration of the multifunction peripheral 11 and the information processing device 10, and a process executed by the program 38 will be described in detail below.

First, a communication between the information processing device 10 and the multifunction peripheral 11 will be described. When the information processing device 10 is a personal computer, the information processing device 10 and the multifunction peripheral 11 are respectively connected to a local network 13 constituted, for example, by a wired LAN, a wireless LAN, a WAN, or a combination of the same. Alternatively, the information processing device 10 and the multifunction peripheral 11 may be connected to each other by a cable such as a USB® cable. When the information processing device 10 is a wireless communication device such as a mobile terminal or a tablet, the multifunction peripheral 11 is connected to the local network 13 in which an access point is provided. The information processing device 10, which is a wireless communication device, communicates with the multifunction peripheral 11 through the access point and the local network 13. In the following description, an example in which the information processing device 10 is a personal computer, and the information processing device 10 and the multifunction peripheral 11 are connected to the local network 13 will be described.

The multifunction peripheral 11 is equipped with a print engine 54, a scanner 55, a user I/F 52, a communication I/F 53, and a controller 51. It is noted that the print engine 54 may have an arbitrary configuration. That is, the multifunction peripheral 11 may be a scanner having a scanning function. The communication I/F 53 is connected to the local network 13 described above. It is noted that "I/F" is an abbreviation for an interface.

The print engine 54 has a function of printing an image on a sheet. The print engine 54 may, for example, print an image on a sheet by ejecting ink droplets onto the sheet, by transferring toner onto the sheet, or by means of a thermal transfer.

The scanner 55 has a function of generating image data by reading an image formed on an original document placed on a contact glass. In addition, the scanner 55 has a function of continuously conveying a plurality of original documents and generating a plurality of pieces of image data by reading the images formed on the original documents being conveyed. That is, the scanner 55 has a so-called ADF (abbreviation for Auto Document Feeder) function.

A user I/F 52 is, for example, a touch sensor that the touch panel provided to the multifunction peripheral 11 has, or an operation switch provided to the multifunction peripheral 11.

The controller 51 is equipped with a CPU 61, which is a central processing unit, a memory 62, and a bus 63. The controller 51 is realized, for example, by a microcomputer or an IC implemented on a pattern circuit board.

The CPU 61 and the memory 62, the print engine 54, the scanner 55, the user I/F 52, and the communication I/F 53 described above are connected to the bus 63. That is, the CPU 61, which is a computer, is configured to transmit and receive information, data, drive signals, and the like to and from the memory 62, the print engine 54, the scanner 55, the user I/F 52, and the communication I/F 53 through the bus 63.

The memory 62 has a program storage area 64 for storing various programs, and a data storage area 65 for storing information and data. The memory 62 is, for example, a ROM, a RAM, an HDD, a portable storage medium such as a USB memory, an EEPROM, a buffer provided by the CPU 61, and the like.

The memory 62 may be a computer-readable storage medium. The computer-readable storage medium is a non-transitory medium. The non-transitory mediums include recording media such as CD-ROMs, DVD-ROMs, and the like, in addition to the examples above. The non-transitory medium is also a tangible medium. On the other hand, an electrical signal carrying a program that is downloaded from a server on the Internet or the like, is a computer readable signal medium, which is a kind of the computer readable medium, but is not included in the non-transitory computer readable medium. The same applies to a memory 32 described below.

The program storage area 64 is configured to store the OS 66, which is the operating system, and a control program 67. The control program 67 is configured to input print data to the print engine 54, thereby causing the print engine 54 to execute printing. The control program 67 is also configured to input a drive signal to the scanner 55, thereby controlling the scanner 55 to execute scanning, and to receive image data generated by the scanner 55.

The information processing device 10 is equipped with a controller 21, a user I/F 22, a communication I/F 23, and a display 24. The user I/F 22 is, for example, a mouse, a keyboard, a microphone, and the like. The communication I/F 23 is connected to the local network 13.

The controller 21 is equipped with a CPU 31, which is a central processing unit, a memory 32, and a bus 33. The CPU 31 and the memory 32, and the user I/F 22, the communication I/F 23, and the display 24 described above are connected to the bus 33.

The memory 32 has the same configuration as the memory 62 of the multifunction peripheral 11, and has a program storage area 34 and a data storage area 35. The program storage area 34 is configured to store an OS 36, which is an operating system, an external program 37, and a program 38.

When the information processing device 10 is a personal computer, the OS 36 is Windows®, MacOS®, Unix®, Linux®, and the like. When the information processing device 10 is a portable terminal or a tablet, the OS 36 is WindowsPhone®, iOS®, AndroidOS®, BLACKBerryOS®, and the like.

The OS 36, the external program 37, and the program 38 are executed by the CPU 31 as instructions described in the respective programs are executed by the CPU 31. The OS 36, external programs 37, and programs 38 are executed in pseudo-parallel by so-called multitasking.

The external program 37 is a program that receives instructions from the user and instructs the multifunction peripheral 11 to perform scanning through the program 38. The external program 37 has a main module 41 and a first UI module 42. Processes executed by the main module 41 and the first UI module 42 of the external program 37 will be described later.

The program 38 is a program that instructs the scanner 55 of the multifunction peripheral 11 to scan and executes processing of the image data generated by the scanner 55. The processing of the image data includes at least arranging of the plurality of image data generated by the scanner 55 into a page.

The program 38 has a core module 43 and a second UI module 44. The external program 37 described above uses the first UI module 42 to receive the user's input. Alternatively, when the external program 37 does not have the first UI module 42, the external program 37 uses the second UI module 44 that the program 38 has to receive the user's input. Since the program 38 has the second UI module 44, the program 38 can also support the external program 37 that does not have the first UI module 42. It is noted that when the external program 37 has the first UI module 42, the program 38 does not need to have the second UI module 44. Than is, the second UI module 44 has an arbitrary configuration.

Figure 4A:
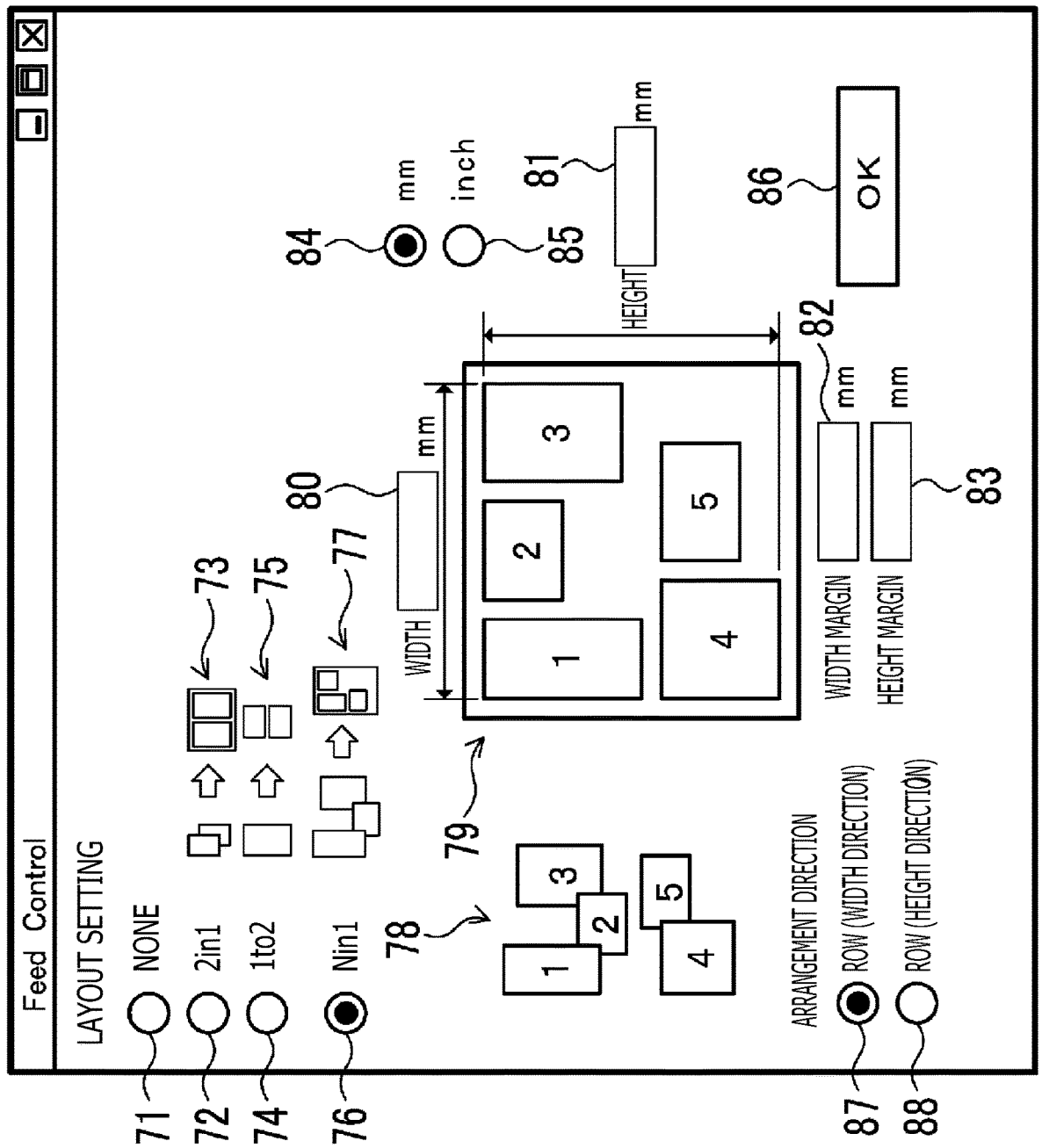
FIG. 4A shows a setting screen with a radio button being selected.

The data storage area 35 is configured to store a base position and setting screen data that indicates a setting screen (FIG. 4A). The setting screen is a screen for receiving an input of scan settings for causing the scanner 55 of the multifunction peripheral 11 to perform scanning. The setting screen data is stored in the data storage area 35 when, for example, the program 38 is set up in the information processing device 10. It is noted that the setting screen data may be included in the program 38. The setting screen will be described later.

The base position is a position that serves as a base point for arranging the plurality of images represented by the image data generated by the scanner 55 of the multifunction peripheral 11 on the page. The details of the base position will be described below.

Hereinafter, the processes performed by the external program 37 and the program 38 will be described in detail. In the present specification, processes of the CPU 31 in accordance with the instructions described in the programs will be basically described. In other words, "decision," "extracting," "selecting," "calculating," "determining," "identifying," "obtaining," "receiving," "controlling," "setting," and the like in the following description represent processes performed by the CPU 31. It is noted that the processes performed by the CPU 31 includes hardware control via the OS 36. It is noted that the term "obtain" is used in a concept that it does not require a request. In other words, a process of receiving data without a request by the CPU 31 is also included in the concept of "obtaining of data by the CPU 31." Further, "data" in the present specification is represented by a computer-readable bit string. Data with the same substantive meaning content but different formats will be treated as the same data. The same applies to "information" in the present specification. The processes of "command," "response," "request," and the like are performed by communicating information indicating "command," "response," "request," and the like. The terms "command," "response," "request," and the like may be described in the sense of the information itself indicating the "command," "response," "request," and the like.

It is noted that a process performed by the CPU 31 according to the instructions described in the program may be described in abbreviated wording. For example, descriptions such as "the CPU 31 performs," "the controller 21 performs," or "the program performs" may be used.

Further, a process, performed by the CPU 31, to determine whether or not information A indicates a matter B may be described conceptually as "determining whether or not it is a matter B based on information A." The process, performed by the CPU 31, to determine whether information A indicates a matter B or a matter C may be described conceptually as "determining whether matter B or matter C based on information A."

The terms "data" and "information" in the present specification have in common that they are bits or bit strings that can be handled by a computer. The term "data" refers to anything that can be handled by a computer without considering the semantic content of each bit. On the other hand, "information" refers to something that causes the computer to branch out its operation depending on the semantic content indicated by each bit. Furthermore, an "instruction" is a control signal that prompts a destination device to perform a next action, which may contain information or may itself have the nature of information.

It is noted that, even if the format (e.g., text format, binary format, flag format, or the like) is differentiated among computers, the "data" and "information" are treated as the same data and information as long as they are recognized as the data or information having the same semantic content. For example, information indicating "two" is stored in text format as "0×32" in ASCII code in one computer, while the information may be stored in binary format as "10 " in another computer.

However, the above distinction between "data" and "information" is not a strict one, and exceptional handling may be allowed. For example, data may be temporarily treated as information, and information may be temporarily treated as data. Further, what is treated as data in one device may be treated as information in another device. Furthermore, information may be taken out of data, or data may be taken out of information.

In addition, an expression "according to" in the present specification indicates that a process described after the expression is executed when a condition described before the expression is satisfied. It is noted that a timing at which the process is executed may be any time after the condition is satisfied, and does not necessarily have to be immediately after the condition is satisfied.

In the following description, the image data generated by the scanner 55 will be described as scanned image data, and the image represented by the scanned image data will be described as a scanned image. The scanned image is an example of an obtained image.

Figure 2B:
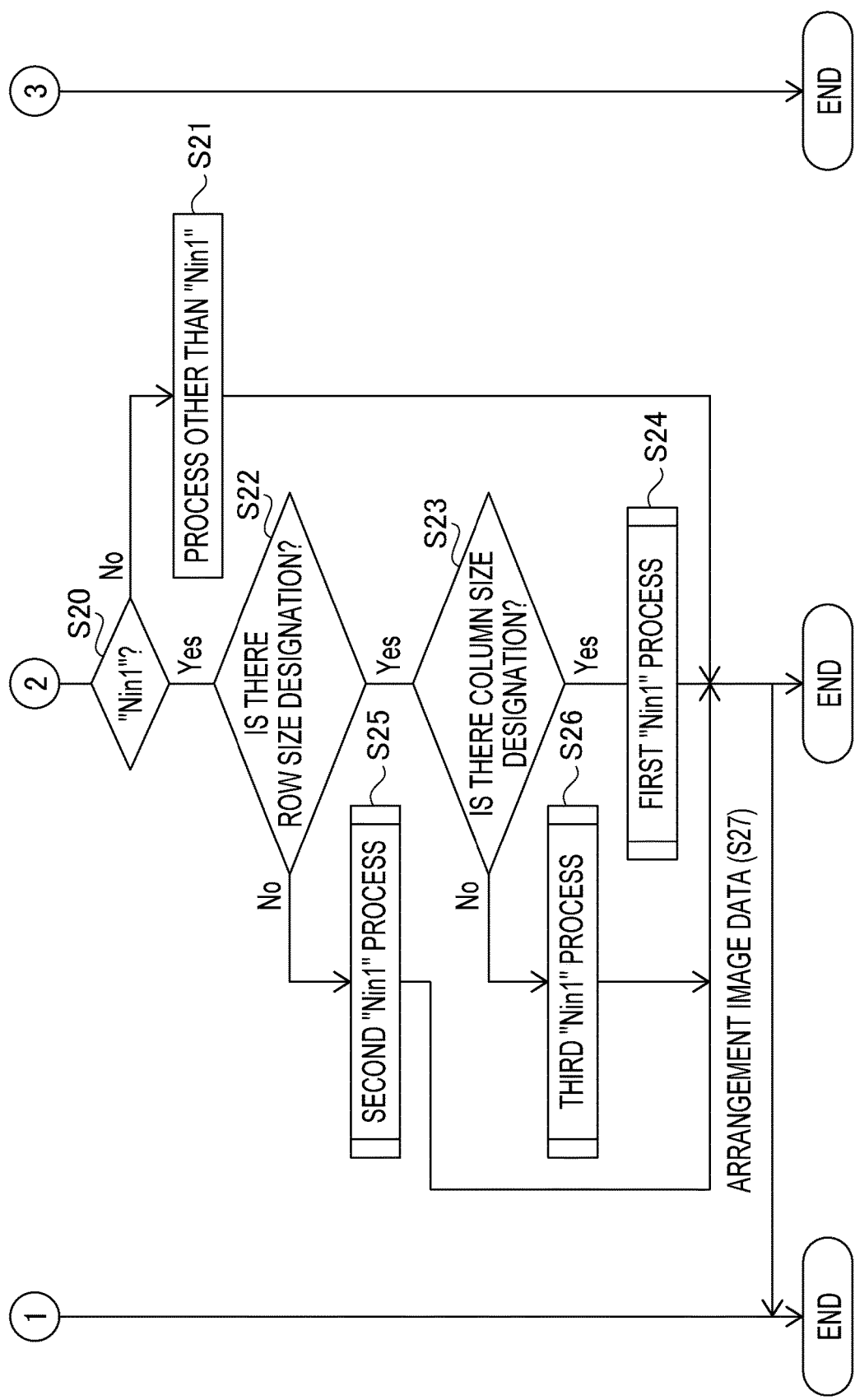

As shown in FIG. 2, the external program 37 causes the setting screen (FIG. 4A, FIG. 10A) to be displayed on the display 24 of the information processing device 10 (S11). The first UI module 42 of the external program 37 causes the setting screen to be displayed on the display 24 through the OS 36 using the setting screen data that the external program 37 has. When the external program 37 does not have the setting screen data, the external program 37 may obtain the setting screen data from the program 38 by calling the API that the program 38 has, and display the setting screen on the display 24 using the obtained setting screen data. When the external program 37 does not have the first UI module 42, the external program 37 may call the API that the program 38 has. The program 38 uses the second UI module 44 to display the setting screen on the display 24. The process in which the second UI module 44 of the program 38 displays the setting screen on the display 24 is an example of a displaying process.

The setting screen, as shown in FIG. 4A, has a text "Layout Settings," a radio button 71, a text "None" displayed on the right of the radio button 71, a radio button 72, a text "2in1" displayed on the right of the radio button 72, a first object 73, a radio button 74, a text "1to2" displayed to the right of the radio button 74, a second object 75 displayed to the right of the text "1to2", a radio button 76, a text "Nin1" displayed to the right of the radio button 76, and a third object 77 displayed to the right of the character string "Nin1."

The first object 73 is an object indicating that two images are to be arranged on one page. The second object 75 is an object indicating that one image is to be arranged on two pages. The third object 77 is an object indicating that a plurality of images are to be arranged on one page as many as possible. The user selects one of the radio buttons 71, 72, 74, and 76. An example shown in the drawing indicates that the radio button 76 is being selected. In the following description, a case where the radio button 76 is selected will be mainly explained.

Although not shown in a flowchart, when the external program 37 determines that the radio button 76 has been selected, the external program 37 displays the fourth object 78 and the fifth object 79 on the setting screen based on the obtained setting screen data. The fourth object 78 is an object that indicates a plurality of scanned images. In the example shown in the drawing, the fourth object 78 indicates five scanned images. The fifth object 79 is an object that shows the plurality of scanned images arranged on a single page. In the following description, the page on which the plurality of scanned images are arranged will be described as an arranged page. The arranged page is an example of a placement area.

In the fifth object 79, the five scanned images arranged on the arranged page indicate the regularity of arrangement on the arranged page. To explain in detail, the setting screen further has a text "arrangement direction," a radio button 87, a text "Row (width direction)" arranged to the right of the radio button 87, a radio button 88, and a text "Row (height direction)" arranged to the right of the radio button 88, as objects to designate the arrangement regularity. When the external program 37 determines that the radio button 76 has been selected, the external program 37 displays a text "arrangement direction," the radio buttons 87 and 88, the text "Row (width direction)," and the text "Row (height direction)" on the setting screen.

The radio button 87 is a radio button that specifies that a direction in which the scanned images are first aligned is the width direction. The radio button 88 is a radio button that specifies that the direction in which the scanned images are initially aligned is the height direction. The "Row" shown in the drawing indicate the plurality of scanned images themselves to be arranged first, and the direction in which the plurality of scanned images are aligned. To explain in detail, in the example shown in FIG. 4A, the "Row (width direction)" is designated by the radio button 87. That is, the "Row (width direction)" indicates that the direction in which the plurality of scanned images to be aligned first is the width direction. Then, the fifth object 79, which is displayed on the setting screen in response to the radio button 87 being designated, indicates that the scanned images to be aligned first are aligned along the width direction from left to right. The fifth object 79 also indicates that the scanned image numbered "4," which is a scanned image that cannot be arranged in a single row, will be arranged below the "single row" consisting of three scanned images numbered "1" to "3." Further, the fifth object 79 indicates that the scanned image numbered "5," which is a scanned image to be arranged on the arranged page next to the scanned image numbered "4," is arranged alongside the scanned image numbered "4" in the direction (width direction) indicated by the "Row." When the "Row (width direction)" is designated, the width direction is an example of the first arrangement direction. The height direction along which multiple rows are aligned is an example of the second arrangement direction.

Figure 10A:
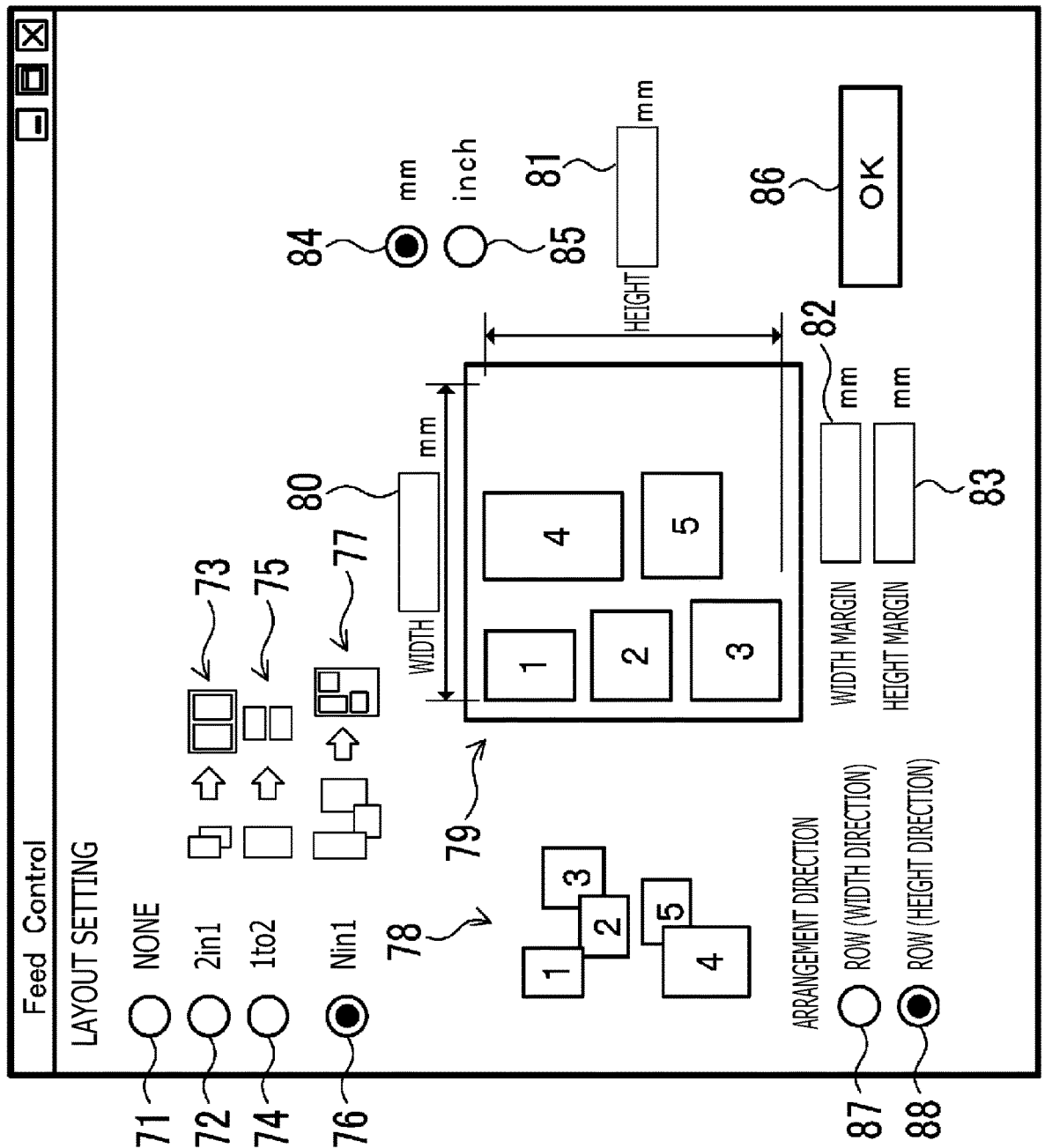
FIG. 10A shows a setting screen with a radio button being selected.

FIG. 10A shows an example where the "Row (height direction)" is designated by the radio button 88. The "Row (height direction)" indicates that the direction in which the multiple scanned images are initially aligned is the height direction. The fifth object 79, which is displayed on the setting screen in response to the radio button 88 being designated, indicates that the first scanned images to be aligned will be aligned along the height direction from top to bottom. The fifth object 79 also indicates that the scanned image numbered "4," which is a scanned image that cannot be arranged in a single row, is arranged to the right of the "single row" consisting of the three scanned images numbered "1" to "3." Further, the fifth object 79 indicates that the scanned image numbered "5," which is the scanned image to be arranged on the arranged page next to the scanned image numbered "4," is arranged alongside the scanned image numbered "4" in the direction (height direction) indicated by "Row." When the "Row (height direction)" is designated, the height direction is an example of the first placement direction. The width direction where multiple rows are aligned is an example of the second placement direction.

The setting screen does not have to have the text "placement direction," the radio buttons 87 and 88, the text "Row (width direction)," and the text "Row (height direction)," In such a case, the information indicating the arrangement direction is stored in memory 32 in advance. The external program 37 displays the setting screen shown in FIG. 4A or FIG. 10A on the display 24 based on the information indicating the arrangement direction stored in the memory 32.

When the external program 37 determines that the radio button 76 is selected, based on the obtained setting screen data, the external program 37 displays the text "width," the text box 80 displayed to the right of the text "width," the text "mm" displayed to the right of the text box 80, the text "height," the text box 81 displayed to the right of the text "height," the text "mm" displayed to the right of the text box 81, a text "width margin," a text box 82 displayed to the right of the text "width margin," the text "mm" displayed to the right of the text box 82, the text "height margin," a text box 83 displayed to the right of the text "height margin," and the text "mm" displayed to the right of the text box 83 on the setting screen.

The text box 80 is a text box that receives the input of a row size or column size of the arranged page where the multiple scanned images are arranged. The "row size" means a size of the arranged page in the direction indicated by the "row." The "row size" means a size of the arranged page in the direction along which the rows are aligned. When the direction indicated by the "row" is the width direction, the direction indicated by the "column" is the height direction. When the direction indicated by the "row" is the height direction, the direction indicated by the "column" is the width direction. When the "row (width direction)" is designated by the radio button 87, the "row size" is the size of the arranged page in the width direction, and the "column size" is the size of the arranged page in the height direction. When the "row (height direction)" is designated by the radio button 88, the "row size" is the size of the arranged page in the height direction, and the "column size" is the size of the arranged page in the width direction.

To explain in more detail, when the "row (width direction)" is designated by the radio button 87 (FIG. 4A), the text box 80 receives the input of the "row size." When the "row (height direction)" is designated by the radio button 88 (FIG. 10A), the text box 80 receives the input of the "column size." The "row size" or the "column size" received through the text box 80 is the size that does not include the left and right margin sizes set on both sides of the arranged page. It is noted, however, the "row size" or the "column size" received through the text box 80 may include the left and right margin sizes. The "row size" of the arranged page is an example of a first area size. The "column size" of the arranged page is an example of a second area size.

Similarly, the text box 81 is a text box that receives the input of the "row size" or the "column size" of the arranged page where multiple scanned images are arranged. In detail, when the "row (width direction)" is designated by the radio button 87 (FIG. 4A), the text box 81 receives the input of the "column size." When the "row (height direction)" is designated by the radio button 88 (FIG. 10A), the text box 81 receives the input of the "row size."

The text boxes 80 and 81 is configured to also receive the input of a value of "0." Although described in detail later, when the value entered in the text box 80 is a number other than "0," the program 38 of the information processing device 10 determines the number as the "row size" or the "column size" of the arranged page, while when the value entered in the text box 80 is "0," the program 38 determines that the "row size" or the "column size" of the arranged page is not designated. Similarly, when the value entered in the text box 81 is a number other than "0," the program 38 determines the number as the "column size" or the "row size" of the arranged page, while if the value entered in the text box 81 is "0", the program 38 determines that the "column size" or the "row size" of the arranged page is not designated.

The text box 82 is a text box that receives the input of the width margin, which is a distance between two scanned images aligned in the width direction. In the example shown in FIG. 4A, the width margin indicates, for example, a distance between the scanned image numbered "1" and the scanned image numbered "2." In the example shown in FIG. 10A, the width margin indicates a distance between the scanned image numbered "3" and the scanned image numbered "4" or "5."

The text box 83 is a text box that receives the input of the height margin, which is a distance between two scanned images aligned in the height direction. In the example shown in FIG. 4A, the height margin indicates, for example, a distance between the scanned image numbered "1" and the scanned image numbered "4" or "5." In the example shown in FIG. 10A, the height margin indicates a distance between the scanned image numbered "1" and the scanned image numbered "2."

When the external program 37 determines that the radio button 76 is selected, the external program 37 displays the radio button 84, the text "mm" displayed to the right of the radio button 84, the radio button 85, the text "inch" displayed to the right of the radio button 85, and the "OK" icon 86 on the setting screen based on the obtained setting screen data.

The external program 37 displays the text "mm" to the right of each of the text boxes 80, 81, 82, and 83, as shown in FIG. 4A, in response to the radio button 84 being selected. The external program 37 displays text "inch" to the right of each of the text boxes 80, 81, 82, and 83 in place of the text "mm" in response to the radio button 85 being selected.

When the external program 37 determines that the user has selected the "OK" icon 86 using the user I/F 22, the external program 37 displays the "Nin1 designation information," which is information indicating that the radio button 76 is being selected, the "first page size," which is a value entered in the text box 80, the "second page size," which is a value entered in the text box 8, "second page size" which is the value entered in text box 81, "arrangement direction information" which indicates which of the radio button 87 and the radio button 88 is selected, "width margin" which is, as described above, the value entered in text box 82, "height margin" which is, as described above, the value entered in the text box 82, the "height margin" described above, which is the value entered in the text box 83, and the "unit information" indicating which of the radio button 84 and the radio button 85 is selected (S12 in FIG. 2). It is noted that, when the arrangement direction information indicates that radio button 87 is selected, as described above, the first page size is the "row size" described above, and the second page size is the "column size" described above. If the arrangement direction information indicates that the radio button 88 is selected, the first page size is the "column size" and the second page size is the "row size." The process in which the program 38 receives the setting values by the second UI module 44 of the program 38 is an example of a receiving process.

The external program 37 passes the obtained setting values to the program 38 (S13) as shown in FIG. 2. For example, the external program 37 calls the API that the core module 43 of the program 38 has, and passes the file path indicating the setting value to the core module 43.

The program 38 of the information processing device 10 obtains the setting values from the external program (S13). The process of step S13 in which the program 38 obtains the setting values received by the first UI module 42 of the external program 37 is an example of a second obtaining process. The process in which the program 38 obtains the setting values using the second UI module 44 of the program 38 is an example of a third obtaining process.

The program 38 of the information processing device 10 stores the obtained setting values in the memory 32 (S135). The process of the program 38 to store the arrangement direction information contained in the setting values in the memory 32 is an example of a storage process.

After obtaining the setting values, the program 38 transmits an execution instruction causing the scanner 55 to perform scanning to the multifunction peripheral 11 through the OS 36, the communication I/F 23, and the local network 13 (S14). The execution instruction is, for example, a command that can be interpreted by the control program 67 of the multifunction peripheral 11.

When the control program 67 of the multifunction peripheral 11 receives an execution instruction through the communication I/F 53 (S14), the control program 67 inputs a drive signal to the scanner 55 to start scanning (S15). Then, the control program 67 obtains a plurality of pieces of scanned image data generated by the scanner 55 by scanning (S16). For example, the scanner 55 scans the original documents, which are sales slips, receipts, and the like, in order using the ADF function described above, and generates the scanned image data in the scanning order. The control program 67 generates transmission data including the scanned image data generated by the scanner 55 and the arranged image size indicating the size of the scanned image represented by the scanned image data (S17). The arranged image size is, for example, header information. The arranged image size includes a first arranged image size indicating the size in the width direction of the scanned image and a second arranged image size indicating the size in the height direction of the scanned image. The first arranged image size is, for example, the number of pixels of the scanned image in the width direction. The second arranged image size is, for example, the number of pixels of the scanned image in the height direction.

For example, each time the control program 67 generates transmission data, the control program 67 transmits the generated transmission data to the information processing device 10 through the communication I/F 53 and the local network 13 (S18). That is, the control program 67 transmits a plurality of pieces of transmission data to the information processing device 10, in order.

The program 38 of the information processing device 10 receives the transmission data through the communication I/F 23 and the OS 36 (S18). The process of S18 in which the program 38 receives the transmission data is an example of the first obtaining process. The scanned image data included in the transmission data is an example of image data.

The program 38 assigns, to each piece of received transmission data, a reception number indicating the order in which the transmission data was received and store the transmission data in the memory 32 of the information processing device 10 (S19). Alternatively, the program 38 stores the transmitted data in the memory 32 so that the order of reception can be determined.

The program 38 determines whether or not the setting value obtained in S13 includes "Nin1 designation information" (S20). When the program 38 determines that the setting value obtained in S13 does not include the "Nin1 specification information" (S20: NO), the program 38 executes a process other than "Nin1" (S21) and terminates the process. The process other than "Nin1" includes the "2in1" process which is performed when the above-mentioned radio button 72 is selected, and the "1to2" process which is performed when the above-mentioned radio button 74 is selected. Description on the "2in1" process and description on the "1to2" process are omitted.

When the program 38 of the information processing device 10 determines that the setting value obtained in S13 includes "Nin1 designation information" (S20: YES), based on the above-mentioned first page size and second page size and arrangement direction information included in the setting value obtained in S13 is designated or not (S22). Concretely, the program 38 identifies which of the first page size and the second page size is the "row size" based on the arrangement direction information, and determines that there is a designation of the row size according to the fact that the identified "row size" is a value other than "0" (S22: YES), and determines that the row size is not designated according to the fact that the identified "row size" is "0" (S22: NO).

When the program 38 of the information processing device 10 determines that there is a designation of the row size (S22: YES), the program 38 determines whether there is a designation of the column size in the same manner as in S22 (S23). When the program 38 determines that there is a designation of the row size and a designation of the column size (S22: YES and S23: YES), the program 38 executes the first "Nin1" process (S24).

Figure 3A:
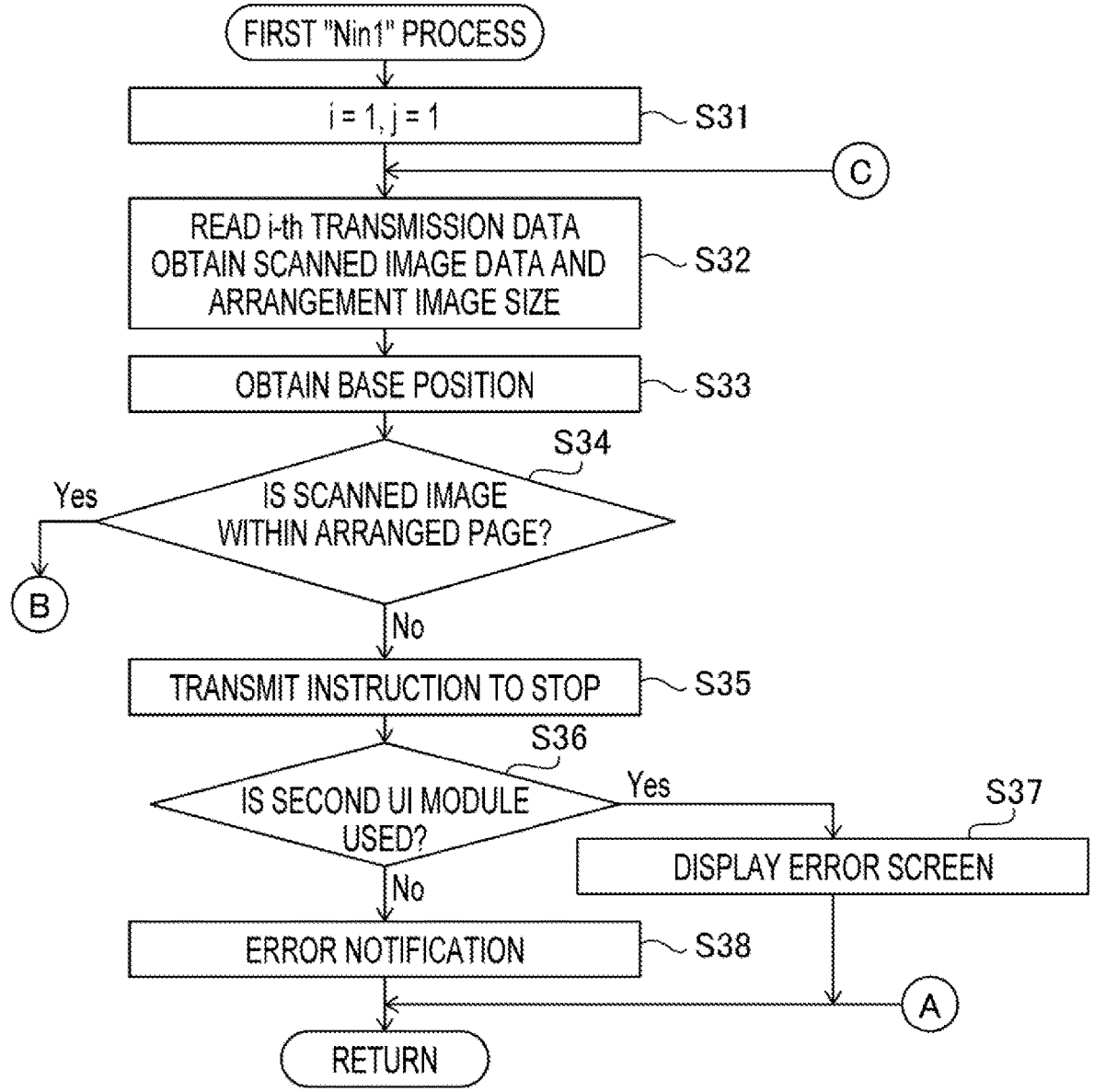
FIGS. 3A, 3B and 3C are a flowchart illustrating a first "Nin1" process.
Figure 3B:
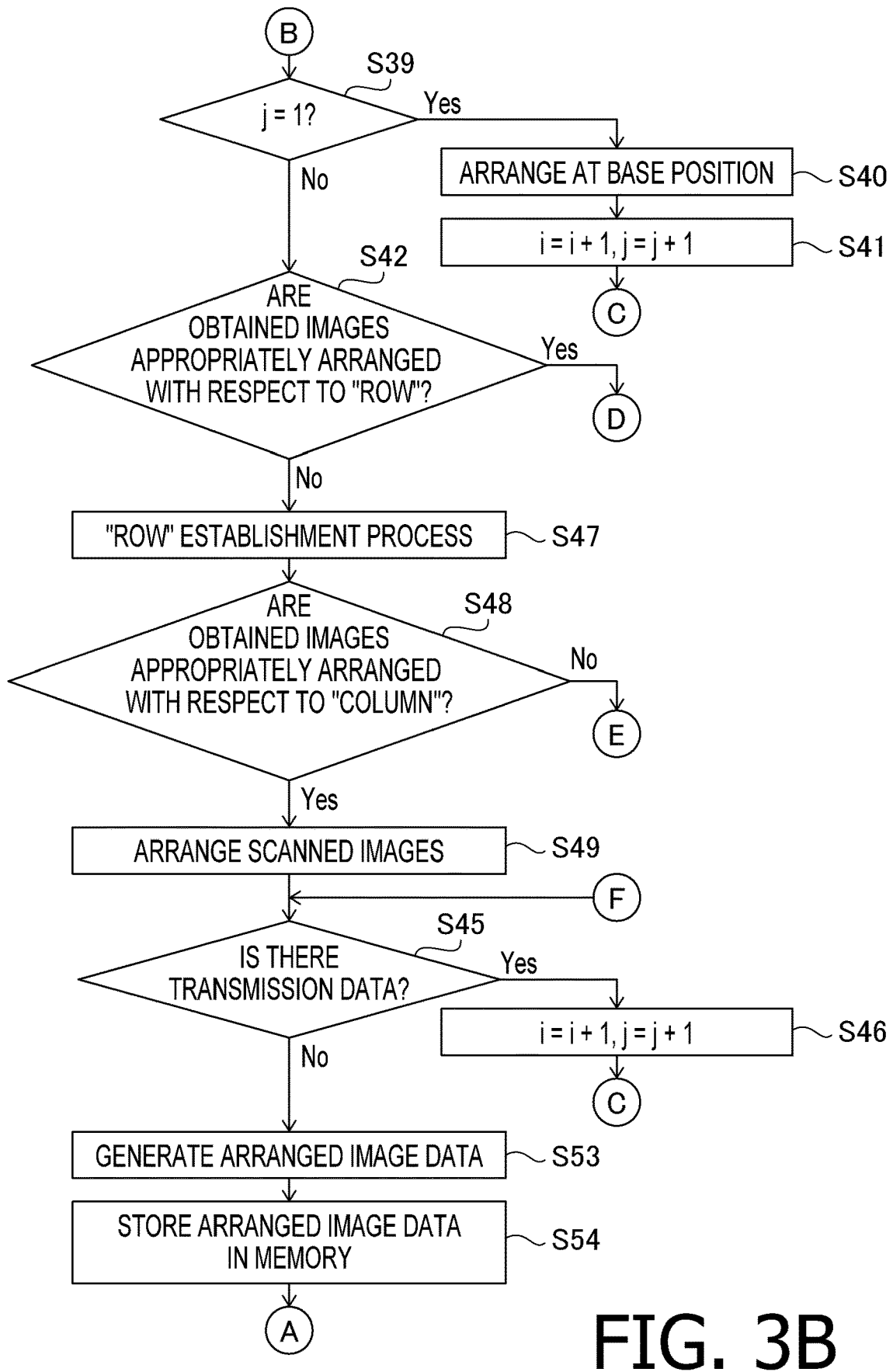
Figure 3C:
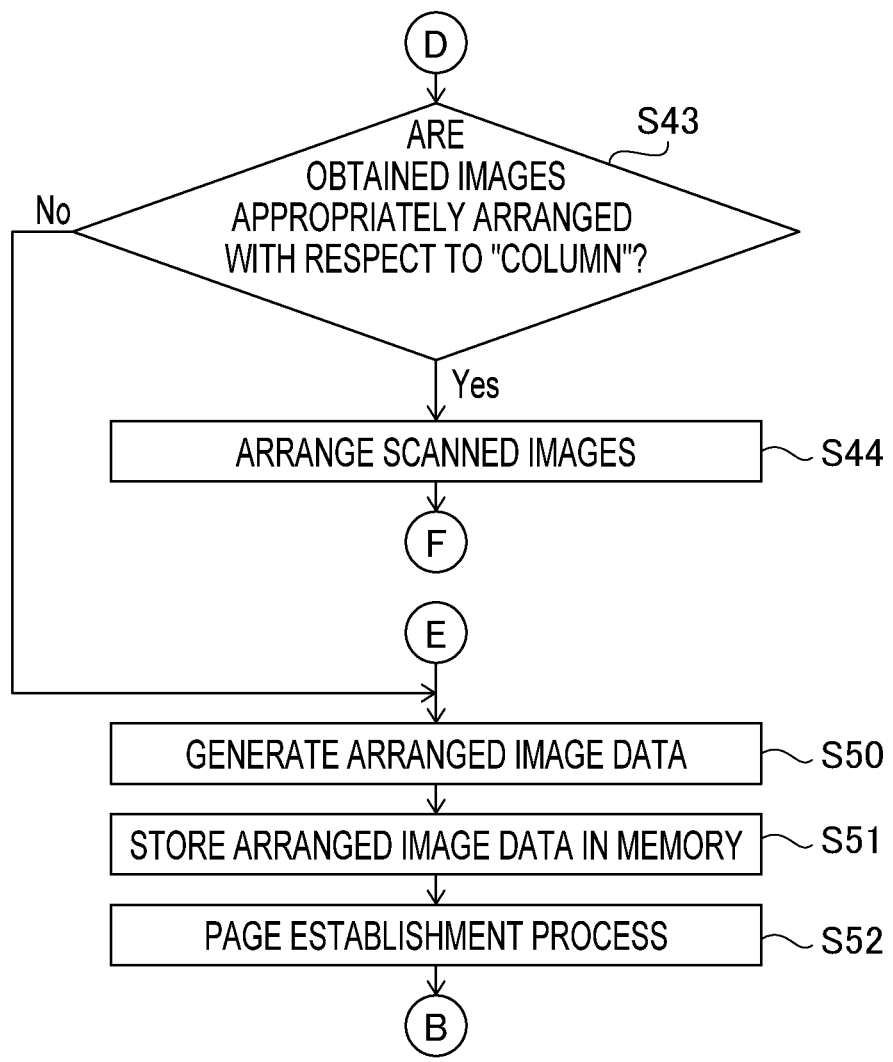

Referring to FIG. 3, the first "Nin1" process will be described. First, the program 38 of the information processing device 10 sets the values of "i" and "j" stored in the memory 32 to the initial value of "1" (S31). The "i" is for obtaining the transmission data stored in the memory 32 in order in S19. The "j" is for determining whether or not the scanned image to be arranged on the arranged page is the first scanned image to be arranged on the arranged page.

The program 38 reads the transmission data with the reception number "i"=1 from the memory 32 and obtains the scanned image data and the arranged image size that the transmission data contains (S32). The process of S32 in which the program 38 obtains the arranged image size is an example of a fourth obtaining process.

The program 38 of the information processing device 10 obtains the base position stored in the memory 32 (S33). The base position is the position that serves as a base point for the arrangement of the first scanned image to be arranged on the arranged page. In the example shown in FIG. 5A, the base position is generally an upper left position of the arranged page. The base position includes a first base position that indicates the position in the width direction and a second base position that indicates the position in the height direction. The base position is, for example, a coordinate with the origin at a position that is the upper left vertex of the arranged page.

The program 38 of the information processing device 10 determines whether the arranged image size obtained in step S32 is within the range of the arranged page (S34). Concretely, the program 38 converts the arranged image size obtained in S32, which is the first arranged image size indicated by the number of pixels, into "mm" or "inch" indicated by the unit information obtained in S13, and determines whether the converted first arranged image size is less than or equal to the first page size obtained in S13. Similarly, the program 38 converts the second arranged image size indicated by the number of pixels into "mm" or "inch" indicated by the unit information, and determines whether the converted second arranged image size is less than or equal to the second page size obtained in step S13. The program 38 determines that the arranged image size is within the range of the arranged page according to the fact that the first arranged image size is less than or equal to the first page size and the second arranged image size is less than or equal to the second page size (S34: YES). The process of S34 in which the program 38 determines whether the arranged image size is within the range of the arranged page is an example of the size determination process.

When the program 38 of the information processing device 10 determines that the size of the arranged image is not within the range of the arranged page (S34: NO), the program 38 sends an instruction to the multifunction peripheral 11 to stop transmission of the transmitted data through the OS 36, the communication I/F 23, and the local network 13 (S35). The instruction is, for example, a command that can be interpreted by the control program 67 of the multifunction peripheral 11. Although not shown in the flowchart, when the control program 67 of the multifunction peripheral 11 receives the instruction through the communication I/F 53, the transmission of the transmitted data is stopped.

The program 38 of the information processing device 10 determines whether or not the second UI module 44 has been used (S36). That is, the program 38 determines whether or not the second UI module 44 has displayed a setting screen on the display 24. When the program 38 determines that the second UI module 44 has been used (536: YES), the program 38 displays, through the OS 36, an error screen on the display 24 of the information processing device 10 to make the user aware that the scanned image cannot be arranged on the arranged page (S37), and terminates the first "Nin1" processing. The error screen data indicating the error screen is the data contained in the program 38. The process of S37 in which the program 38 displays the error screen on the display 24 is an example of the error display process.

When the program 38 of the information processing device 10 determines that the second UI module 44 is not being used (S36: NO), the program 38 passes the error information indicating that the scanned image cannot be arranged on the arranged page to the external program 37 (S38) and terminates the first "Nin1" process.

When the program 38 of the information processing device 10 determines that the arranged image size is within the range of the arranged page in S34 (S34: YES), the program 38 determines whether the value of "j" is "1" or not (S39). That is, the program 38 determines whether or not the scanned image to be arranged is the first scanned image to be arranged on the arranged page. When the program 38 determines that the value of "j" is "1" (S39: YES), the program 38 arranges the scanned image on the arranged page so that the position of the upper left vertex of the scanned image obtained in S32 becomes the base position obtained in S33 (S40). Then, the program 38 increments the values of "i" and "j" (S41), and executes the process of S32 again.

When the program 38 of the information processing device 10 determines that the value of "j" is not "1" in S39 (S39: NO), the program 38 determines whether or not an appropriate arrangement of the scanned images to be arranged is possible for the "row" (S42). The scanned images to be arranged are the scanned images included in the transmission data read in step S32, which have not yet been arranged on the arranged page, and are the scanned images subjected to be processed in S33 onwards. The process of S42 is an example of a first decision process.

The process of step S42 when the arrangement direction information obtained in S13 indicates the "row (width direction)" and the process of S42 when the arrangement direction information obtained in S13 indicates the "row (height direction)" will be described in detail. A core module 43 of the program 38 of the information processing device 10 has a class that specifies, for example, a process of arranging a scanned image in a direction along a "row" and arranging a plurality of "rows" in a direction along a "column." By inputting a value indicating that the direction along the "row" is the width direction into the class, the program 38 generates an object (also referred to as an instance) that executes the process including S42 when the arrangement direction information indicates the "row (width direction)." In addition, the program 38 generates an object that executes the process including S42 in the case where the arrangement direction information indicates the "row (height direction)" by inputting a value indicating that the direction along the "row" is the height direction to the class. In other words, by having the aforementioned class, the program 38 can receive the user's designation that the direction along which the "row" is to be followed is the width direction, or the user's specification that the direction along which the "row" is to be followed is the height direction.

Figure 5A:
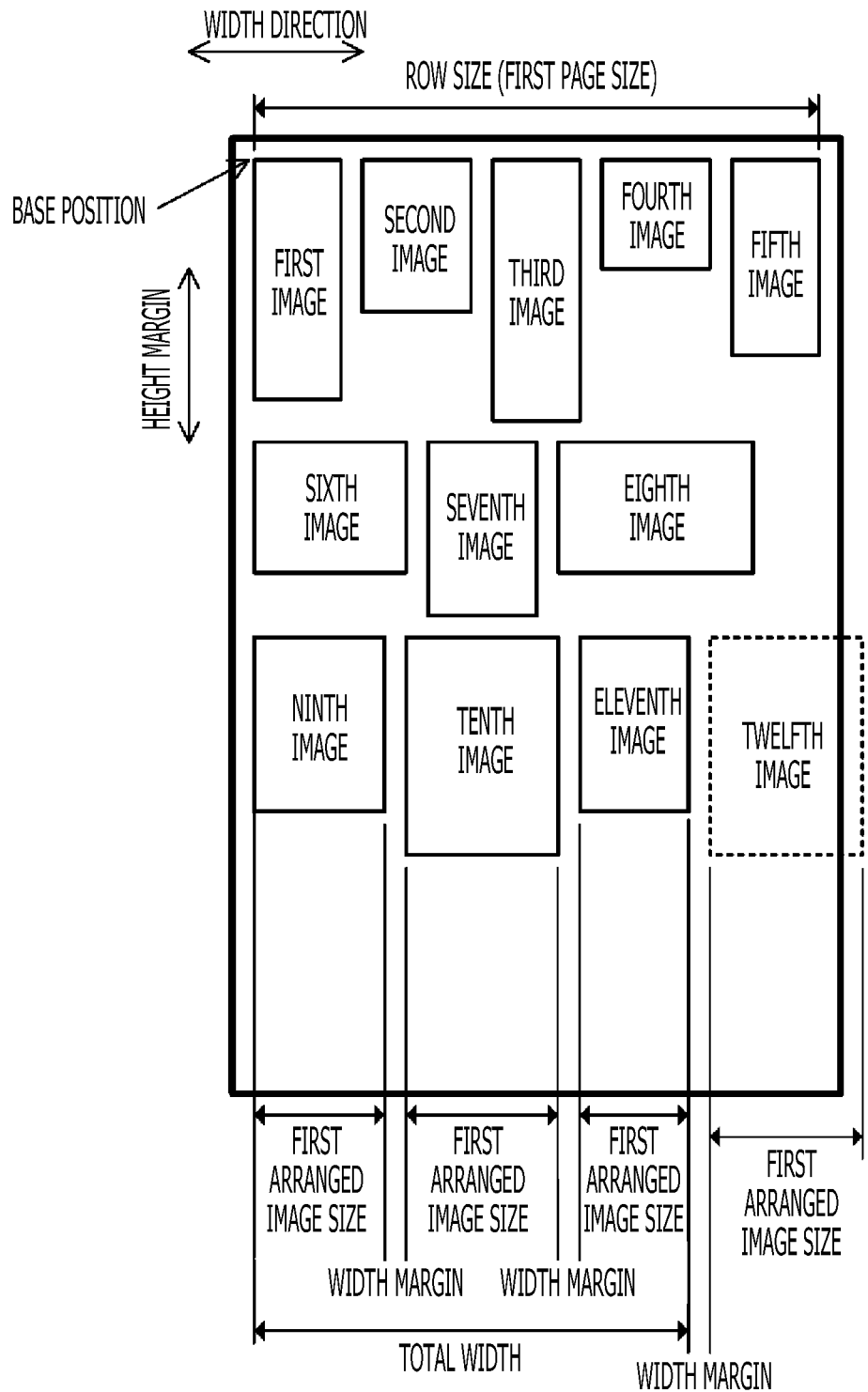
FIGS. 5A and 5B show examples of a scanned image arranged on an arrangement page when a "row (width direction)" is designated in the setting screen.

The process of S42 in the case where the arrangement direction information obtained in S13 indicates the "row (width direction)" will be described in detail with reference to FIG. 5A. FIG. 5A shows the case where the 12th image, which is the scanned image of which receiving number is i=12, is to be arranged on the arranged page. In other words, the 12th image is the image to be arranged. In the following description, the scanned image that has already been arranged on the arranged page will be described as the arranged image.

First, the program 38 of the information processing device 10 calculates the total width shown in FIG. 5A for the "rows" that have not been fixed. The "row" that has not been fixed means the "row" that has not been fixed in a "row" fix process of S47 described below. First, the program 38 calculates, for the "rows" that have not been fixed, the total arranged image size by adding the first arranged image sizes obtained in S32 for respective arranged images. In the example shown in the drawing, the program 38 adds the first arranged image size of the ninth image, the first arranged image size of the tenth image, and the first arranged image size of the eleventh image to calculates the total arranged image size. The total arranged image size is an example of a first total size. The process in which the program 38 calculates the total arranged image size is an example of a first process.

Next, the program 38 calculates a total width margin by multiplying the value obtained by subtracting "1" from the number of arranged images by the width margin. In the example shown in the drawing, the program 38 calculates the total width margin by multiplying the value obtained by subtracting "1" from the number of arranged images "3" by "2." The width margin is an example of a first separation size. The total width margin is an example of a first total separation size. The process in which the program 38 calculates the total width margin based on the number of arranged images and the width margin is an example of a third process.

Next, the program 38 of the information processing device 10 determines whether or not an all total value, which is the sum of the first arranged image size of the twelfth image, which is the scanned image to be arranged, the width margin, and the above-described total width, is less than or equal to the first page size obtained in S13. The program 38 determines that appropriate arrangement is possible for the "rows" according to the fact that the all total value is less than or equal to the first page size (S42: YES). The program 38 determines that appropriate arrangement is not possible for the "rows" according to the fact that the all total value is greater than the first page size (S42: NO). The process in which the program 38 determines whether or not the all total value is less than or equal to the first page size is an example of a second process. When the width margin is "0," the program 38 calculates the all total value by adding the total width and the first arranged image size of the 12th image, which is the scanned image to be arranged.

Next, the process of S42 in the case where the arrangement direction information obtained in S13 indicates the "row (height direction)" will be explained with reference to FIG. 6B. The program 38 calculates the total height shown in FIG. 6B for the "row" that has not been fixed. Concretely, the program 38 calculates the total arranged image size by adding the second arranged image sizes obtained in S32 for respective arranged images. In the example shown in the drawing, the program 38 adds the second arranged image size of the tenth image and the second arranged image size of the eleventh image to calculate the total arranged image size. The total arranged image size is an example of a first total size. The process in which the program 38 calculates the total arranged image size is an example of a first process.

Next, the program 38 calculates a total height margin value by multiplying a value obtained by subtracting "1" from the number of arranged images by the height margin. In the example shown in the drawing, the program 38 calculates the total height margin value by multiplying the value obtained by subtracting "1" from the number of arranged images "2" by the height margin. The height margin is an example of a first separation size. The total height margin value is an example of a first total separation total size. The process in which the program 38 calculates the total height margin value based on the number of arranged images and the height margin is an example of a third process.

The program 38 calculates a total height by adding the calculated total arranged image size and the total height margin value. When the height margin is "0," the process of calculating the total height margin value may be omitted. In that case, the program 38 uses the total arranged image size as the total height.

Next, the program 38 of the information processing device 10 determines whether or not the all total value, which is the sum of the second arranged image size of the twelfth image, which is the scanned image to be arranged, the height margin, and the total height described above, is less than or equal to the second page size obtained in S13. According to the fact that the all total value is less than or equal to the second page size, the program 38 determines that appropriate arrangement is possible with respect to the "rows" (S42: YES). According to the fact that the all total value is greater than the second page size, the program 38 determines that appropriate arrangement is not possible with respect to the "rows" (S42: NO). The process in which the program 38 determines whether or not the total value is less than or equal to the second page size is an example of a second process. When the height margin is "0," the program 38 calculates the all total value by adding the total height and the second arranged image size of the twelfth image, which is the scanned image to be arranged.

As shown in FIG. 3, when the program 38 of the information processing device 10 determines that appropriate arrangement is possible with respect to the "rows" in S42 (S42: YES), the program 38 determines whether appropriate arrangement is possible with respect to the "columns" (S43).

Figure 5B:
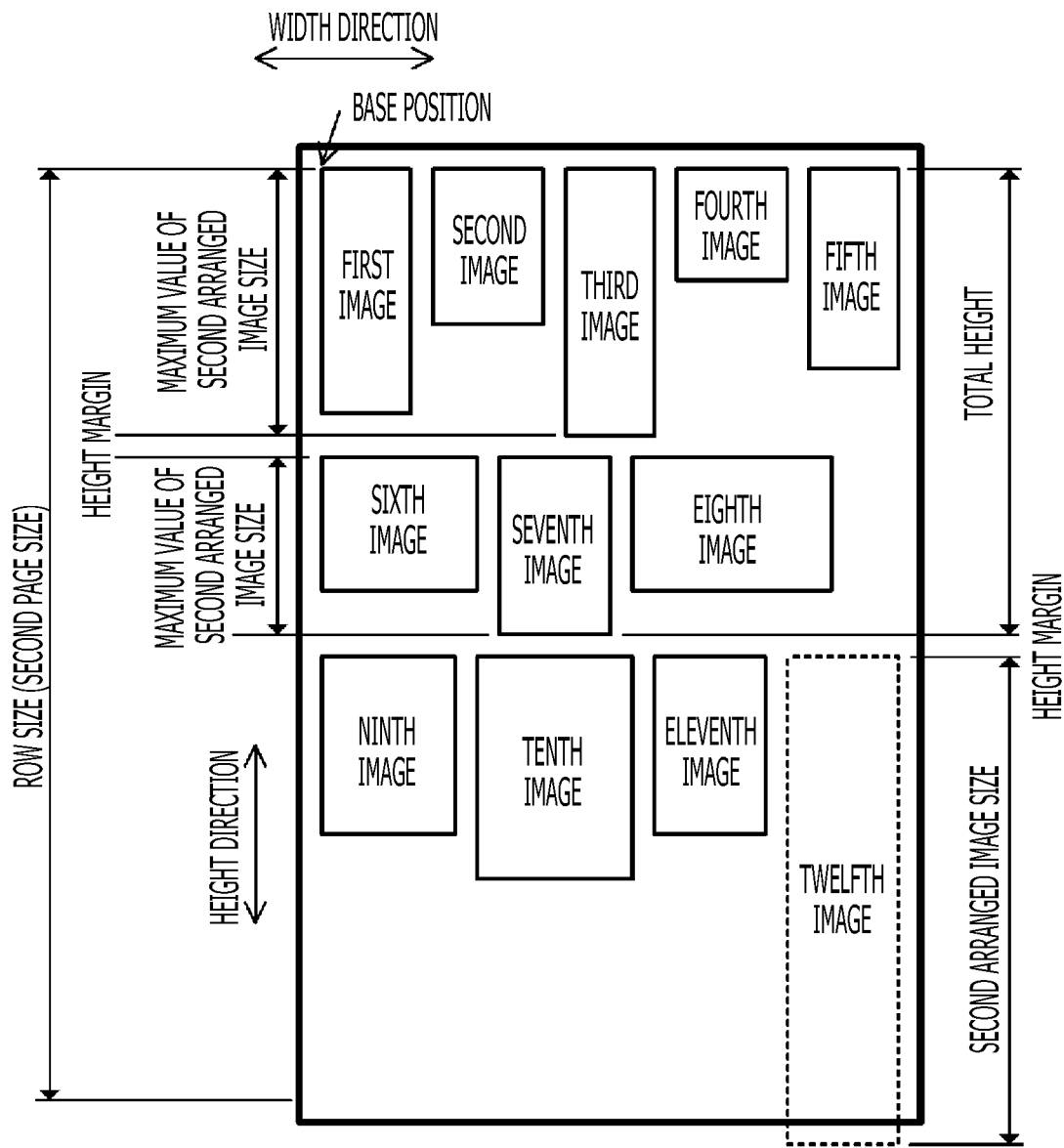

A process of S43 when the arrangement direction information obtained in S13 indicates the "row (width direction)" will be described in detail with reference to FIG. 5B. In FIG. 5B, the first to fifth images are aligned in the width direction and constitute "one row." Further, the sixth to eighth images are aligned in the width direction and constitute "one other row". The ninth to eleventh images are lined up in the width direction and constitute "yet other row."

First, the program 38 of the information processing device 10 calculates the total height shown in FIG. 5B. Concretely, the program 38 calculates the total arranged image size by adding the second arranged image sizes of the arranged images of which second arranged image sizes is the largest among the plurality of arranged images included in respective "rows." In the example shown in the drawing, the program 38 adds the second arranged image size of the third image and the second arranged image size of the seventh image to calculate the total arranged image size. The height of the arranged image is an example of a second size. Among the arranged images in each "row," the arranged image having the largest second arranged image size is an example of a particular arranged image. The second arranged image size of the particular arranged image is an example of a particular second size. A process in which the program 38 obtains the particular second size is an example of a fourth process. The process in which the program 38 calculates the total arranged image size is an example of a fifth process. The total arranged image size is an example of a second total size.

Next, the program 38 of the information processing device 10 calculates the total height margin value by multiplying the value obtained by subtracting 1 from the number of the fixed "rows" by the height margin. The fixed "rows" means the "rows" fixed in the "row" fix process of S47 described below. In the example shown in the drawing, the "one row" described above, which includes the first through fifth images, and the "other one row" described above, which includes the sixth through eighth images, are the "rows" that have been fixed. In other words, in the example shown in the drawing, the number of the fixed "rows" is "2."

The program 38 calculates the total height margin value by multiplying the value "1" obtained by subtracting 1 from the number "2" of established "rows" by the height margin. The height margin is an example of a second separation size. The total height margin value is an example of a second total separation size. The process in which the program 38 calculates the total height margin value is an example of a seventh process.

The program 38 of the information processing device 10 calculates the total height by adding the calculated total arranged image size and the total height margin value. When the height margin is "0," the process of calculating the total height margin value may be omitted. In such a case, the program 38 uses the total arranged image size as the total height.

Next, the program 38 of the information processing device 10 determines whether or not the all total value, which is the sum of the second arranged image size of the twelfth image, which is the scanned image to be arranged, the height margin, and the total height described above, is less than or equal to the second page size. The program 38 determines that appropriate arrangement is possible for the "columns" according to the fact that the all total value is less than or equal to the second page size, as shown in FIG. 3 (S43: YES). The program 38 determines that appropriate arrangement is not possible for the "column" according to the fact that the total value is greater than the second page size (S43: NO). The process in which the program 38 determines whether or not the total value is less than or equal to the second page size is an example of a sixth process. When the height margin is "0," the program 38 calculates the all total value by adding the total height and the second arranged image size of the twelfth image, which is the scanned image to be arranged.

Next, a process of S43 when the arrangement direction information obtained in S13 indicates the "row (height direction)" will be described in detail with reference to FIG. 6B. In FIG. 6B, the first to fourth images are aligned in the height direction and constitute "one row." The fifth to ninth images are aligned in the height direction and constitute "one other row." The tenth and eleventh images are aligned in the height direction and constitute "yet another row."

Figure 6A:
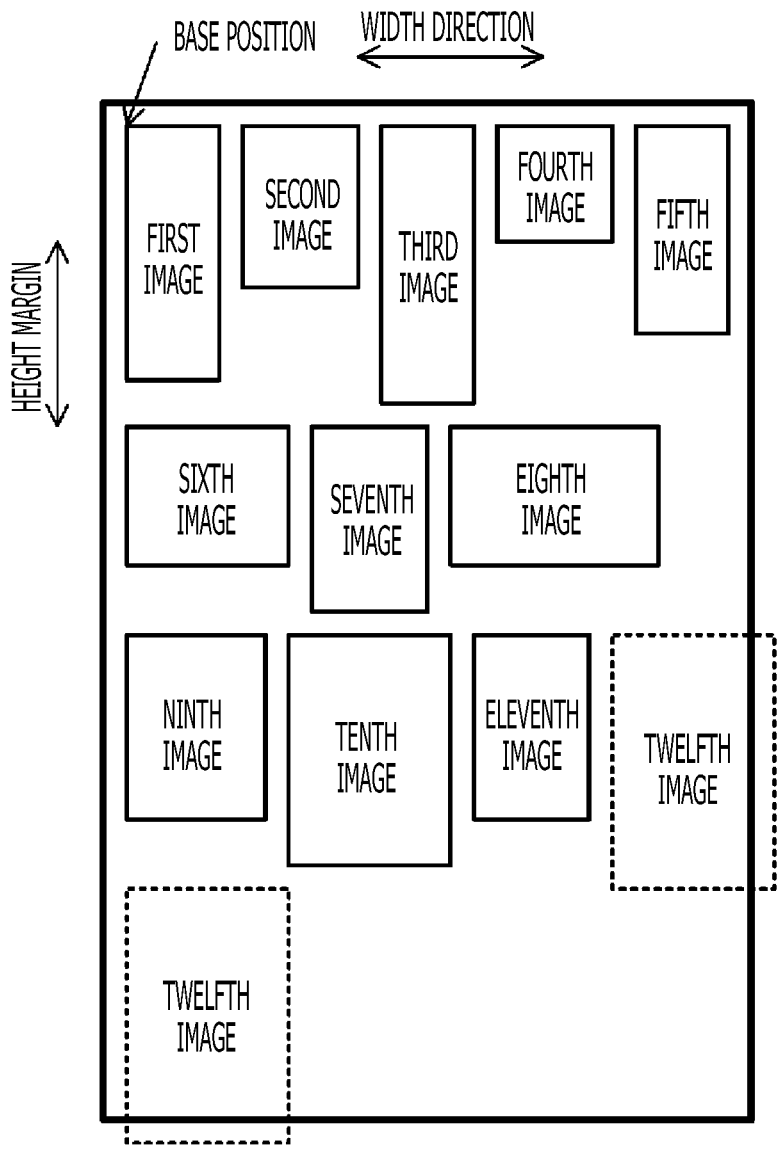
FIG. 6A shows an example of a scanned image arranged on an arrangement page when a "row (width direction)" is designated in the setting screen.
Figure 6B:
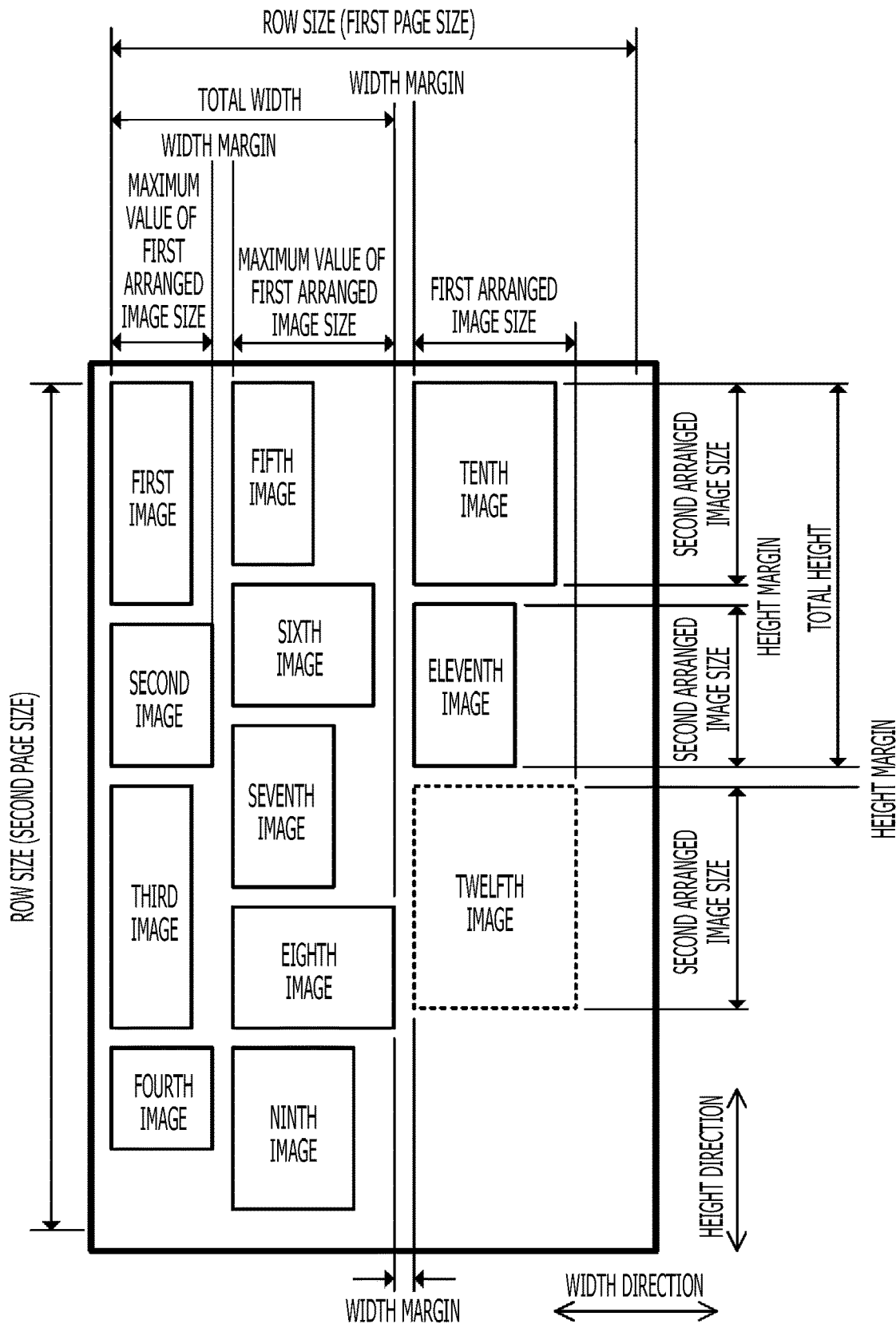
FIG. 6B shows an example of the scanned image arranged on the arrangement page when a "row (height direction)" is designated in the setting screen.

First, the program 38 of the information processing device 10 calculates the total width shown in FIG. 6B. Concretely, the program 38 calculates the total arranged image size by adding the first arranged image sizes of the arranged images having the largest first arranged image size among the plurality of arranged images included in each "row." In the example shown in the drawing, the program 38 adds the first arranged image size of the second image and the first arranged image size of the eighth image to calculate the total arranged image size. The width of the arranged image is an example of the second size. Among the arranged images in each "row," the arranged image having the largest first placed size is an example of a particular arranged image. The first arrangement size of the particular arranged image is an example of a particular second size. The process in which the program 38 obtains the particular second page size is an example of the fourth process. The process in which the program 38 calculates the total arranged image size is an example of the fifth process. The total arranged image size is an example of a second total size.

Next, the program 38 of the information processing device 10 calculates the total height margin value by multiplying the value obtained by subtracting one from the number of fixed "rows" by the height margin. In the example shown in the drawing, the above-described "one row"

including the first to the fourth images and the above-described "one other row" including the fifth to the ninth images are the fixed "rows". In other words, in the example shown in the drawing, the number of fixed "rows" is "2." The program 38 calculates the total width margin value by multiplying the value "1" obtained by subtracting 1 from the number of fixed "rows" "2" by the width margin. The width margin is an example of the second separation size. The total width margin value is an example of the second separation total size. The process in which the program 38 calculates the total width margin value is an example of a seventh process.

The program 38 of the information processing device 10 calculates the total height by adding the calculated total arranged image value and the total height margin value. When the height margin is "0," the process of calculating the total height margin value may be omitted. In such a case, the program 38 uses the total arranged image total size as the total height.

Next, the program 38 of the information processing device 10 determines whether or not the all total value, which is the sum of the first arranged image size of the twelfth image that is the scanned image to be arranged, the width margin, and the total width described above, is less than or equal to the first page size. According to the fact that the all total value is less than or equal to the first page size, as shown in FIG. 3, the program 38 determines that appropriate arrangement is possible with respect to the "column" (S43: YES). According to the fact that the all total value is greater than the first page size, the program 38 determines that appropriate arrangement is not possible with respect to the "column" (S43: NO). The process in which the program 38 determines whether or not the all total value is less than or equal to the first page size is an example of the sixth process. When the width margin is "0," the program 38 calculates the all total value by adding the total width and the first arranged image size of the twelfth image, which is the scanned image to be arranged.

When the program 38 of the information processing device 10 determines that appropriate arrangement is possible with respect to the "row" (S43: YES), the program 38 arranges the scanned images on the arranged page (S44). To describe in detail, when the arrangement direction information obtained in S13 indicates the "row (width direction)," the program 38 identifies a position that is moved to the right by the amount of the width margin from the position of the upper right vertex of the arranged image arranged immediately before. The program 38 arranges the scanned image so that the position of the upper left vertex of the scanned image coincides with the identified position. In response to the arrangement of the scanned image, the program 38 stores the position of the upper right vertex of the arranged scanned image in the memory 32. The position stored in the memory 32 is referred to as the "position of the upper right vertex of the arranged image immediately before" described above in the next scanned image to be arranged.

When the arrangement direction information obtained in S13 indicates the "row (height direction)," the program 38 identifies a position that is moved downward by an amount of the height margin from the position of the lower left vertex of the arranged image that was arranged immediately before. The program 38 arranges the scanned image so that the position of the upper left vertex of the scanned image coincides with the identified position. In response to the arrangement of the scanned image, the program 38 stores the position of the lower left vertex of the arranged scanned image in the memory 32. The position stored in the memory 32 is referred to as the "position of the lower left vertex of the arranged image immediately before" described above in the next scanned image to be arranged.

The program 38 of the information processing device 10 determines, in response to having arranged the scanned image on the arranged page (S44), whether or not the transmission data containing the unarranged scanned image is stored in the memory 32 (S45). For example, in response to the fact that the current value of "i" is less than the maximum value of the receive number attached to the transmitted data stored in the memory 32, the program 38 determines that the transmitted data containing the unarranged scanned image is stored in the memory 32 (S45: YES).

When the program 38 of the information processing device 10 determines that the transmission data containing the unarranged scanned image is stored in the memory 32 (S45: YES), the program 38 increments the values of "i" and "j" (S46) and executes the process from S32 onward again.

When the program 38 of the information processing device 10 determines that appropriate arrangement is not possible with respect to the "row" in the processing of S42 (S42: NO), the program 38 executes the "row" fix process (S47) to fix the "row". In other words, when the program 38 determines that the scanned image cannot be arranged in line with the arranged images in the "row," the "row" is fixed.

For example, when the arrangement direction information obtained in S13 indicates the "row (width direction)," the program 38 identifies the second arranged image size of the arranged image which has been arranged and the position of the lowest point of the arranged image which has been arranged each time a scanned image is arranged on the arranged page. When the identified second arranged image size is larger than the second arranged image size stored in the memory 32, the second arranged image size stored in memory 32 is overwritten with the identified second arranged image size, and the position of the lowest point stored in memory 32 is overwritten with the identified position of the lowest point. The program 38 stores the second placement image size and the position of the lowest point in the memory 32 for the next "row" in response to the establishment of the "low." That is, when the arrangement direction information obtained in S13 indicates the "row (width direction)," the "row" fix process is a process to fix the second arranged image size and the position of the lowest point.

On the other hand, when the arrangement direction information obtained in S13 indicates the "row (height direction)," the program 38 identifies the first arranged image size of the arranged image which has been arranged and the position of the rightmost point of the arranged image each time the scanned image is arranged on the arranged page. When the identified first arranged image size is larger than the first arranged image size stored in memory 32, the first arranged image size stored in the memory 32 is overwritten with the identified first arranged image size, and the position of the rightmost point stored in the memory 32 is overwritten with the identified position of the rightmost point. The program 38 stores the first arranged image size and the position of the rightmost point in the memory 32 for the next "row" in response to the fix of the "row." In other words, when the arrangement direction information obtained in S13 indicates the "row (height direction)," the "row" fix process is a process to fix the first placement image size and the position of the rightmost point.

By the "row" fix process, the maximum value of the second arranged image size or the first image size in each "row" and the position of the bottom point or the rightmost point are determined in the memory 32. When the arrangement direction information obtained in S13 indicates the "row (width direction)," the maximum value of the second arranged image size in each "row" is used to calculate the total height as described in S43. The position of the lowest point is used as the base position for the arrangement position of the first scanned image to be arranged in the next "row." When the arrangement direction information obtained in S13 indicates the "row (height direction)," the maximum value of the first arranged image size in each "row" is used to calculate the total width. The position of the rightmost point is used as the base position for the arrangement position of the first scanned image to be arranged in the next "row."

After executing the row fix process of S45, when the arrangement direction information obtained in S13 indicates the "row (width direction)," the program 38 of the information processing device 10 identifies the position indicated by the first base position obtained in S33 and the position moved downward by an amount of a height margin from the lowest point stored in the memory 32. The position moved down by the amount of the height margin from the lowest point stored in the memory 32 is an example of the third base position. Alternatively, when the arrangement direction information indicates the "row (height direction)," the program 38 identifies the position indicated by the second base position obtained in S33 and the position moved by an amount of a width margin to the right from the rightmost point stored in the memory 32. The position moved by the amount of the width margin to the right from the rightmost point stored in the memory 32 is an example of the third base position.

The program 38 of the information processing device 10 determines whether or not an appropriate arrangement is possible with respect to the "rows" when the scanned image is arranged so that the position of the upper left vertex of the scanned image coincides with the identified position (S48). FIG. 6A shows whether or not the 12th image, which is the image to be arranged, can be aligned in the height direction when the arrangement direction information obtained in S13 indicates the "row (width direction)." The determination process of S48 is performed in the same way as the process of S43 described above. It is noted that the scanned image is arranged on the arranged page with the position moved downward by an amount of the height margin from the lowest point stored in the memory 32 as the base position in the height direction, or with the position moved rightward by the amount of the width margin from the rightmost point stored in the memory 32 as the base position. Accordingly, the arranged images contained in "one row" and the arranged images contained in "one other row" do not overlap each other. The process of S48 in which the program 38 determines whether or not the appropriate arrangement is possible with respect to the "row" is an example of the second determination process.

As shown in FIG. 3, when the program 38 of the information processing device 10 determines that an appropriate arrangement is possible with respect to the "columns" (S48: YES), the program 38 arranges the scanned image on the arranged page so that the position of the upper left vertex of the scanned image overlaps the above-mentioned identified position (S49). Concretely, when the arrangement direction information in S13 indicates the "row (width direction)," the program 38 arranges the scanned image on the arranged page so that it is aligned with the arranged image in the height direction (S49). When the arrangement direction information obtained in S13 indicates the "row (height direction)," the program 38 arranges the scanned image on the arranged page so that it is aligned with the arranged image in the width direction (S49). The process of S49 is an example of the second arrangement process.

After execution of the process of S49, the program 38 of the information processing device 10 executes the process of S45 described above. That is, the program 38 determines whether or not there is any transmitted data containing unarranged scanned image data (S45).

On the other hand, when the program 38 of the information processing device 10 determines that an appropriate arrangement is not possible with respect to the "columns" in S43 and S48 (S42: NO; S48: NO), the program 38 generates arranged image data representing a arranged page containing a plurality of pieces of arranged image data (S50), and stores the generated arranged image data in the data storage area 35 of the memory 32 (S51). For example, the program 38 generates the arranged image data for one page of arranged images as one file data and stores the arranged image data in the memory 32. The process of S50 in which the program 38 generates the arranged image data is an example of the generation process.

After storing the arranged image data in the memory (S51), the program 38 of the information processing device 10 executes the page fix process to fix the arranged page (S52). Concretely, the program 38 sets the value of "j" to "1." Further, the program 38 executes a process to generate a next arranged page. For example, the program 38 initializes a variable such as "j."

After execution of the page fix process (S52), the program 38 of the information processing device 10 executes the process from S32 onward again. In the process of S34, which is executed after the page establishment process is executed, the value of "j" is set to be the initial value of "1." Therefore, the scanned image that is determined not to be arranged on the arranged page in S46 is arranged on the next arranged page in the process of S40 so that the position of the upper left vertex of the scanned image coincides with the base position. The process of S40, which is executed after the execution of the process of S50, is an example of the third arrangement process.

When the program 38 of the information processing device 10 determines in S45 that there is no transmission data containing unarranged scanned image data (S45: NO), the program 38 executes the processes of S53 and S54 described above, and terminates the first "Nin1" process.

After executing the first "Nin1" process (S24), the program 38 of the information processing device 10 passes a file path indicating the file of the generated arranged image data or the file of the arranged image data itself to the external program 37 (S27), as shown in FIG. 2, and terminates the process. The process of S27, in which the program 38 passes the file path indicating the file of the arranged image data or the file of the arranged image data itself to the external program 37, is an example of an output process.

Figure 7A:
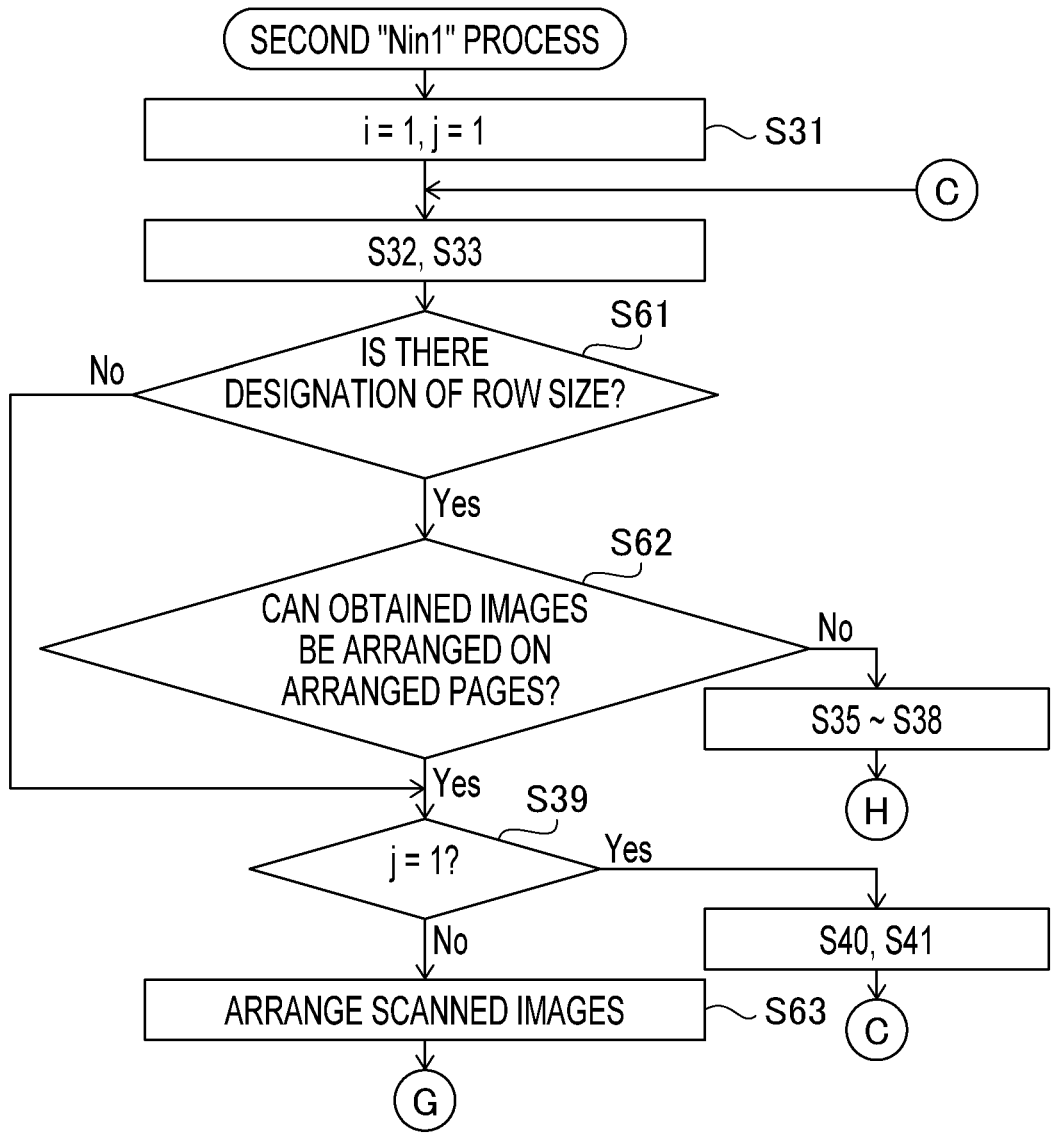
FIGS. 7A and 7B are a flowchart illustrating a second "Nin1" process.
Figure 7B:
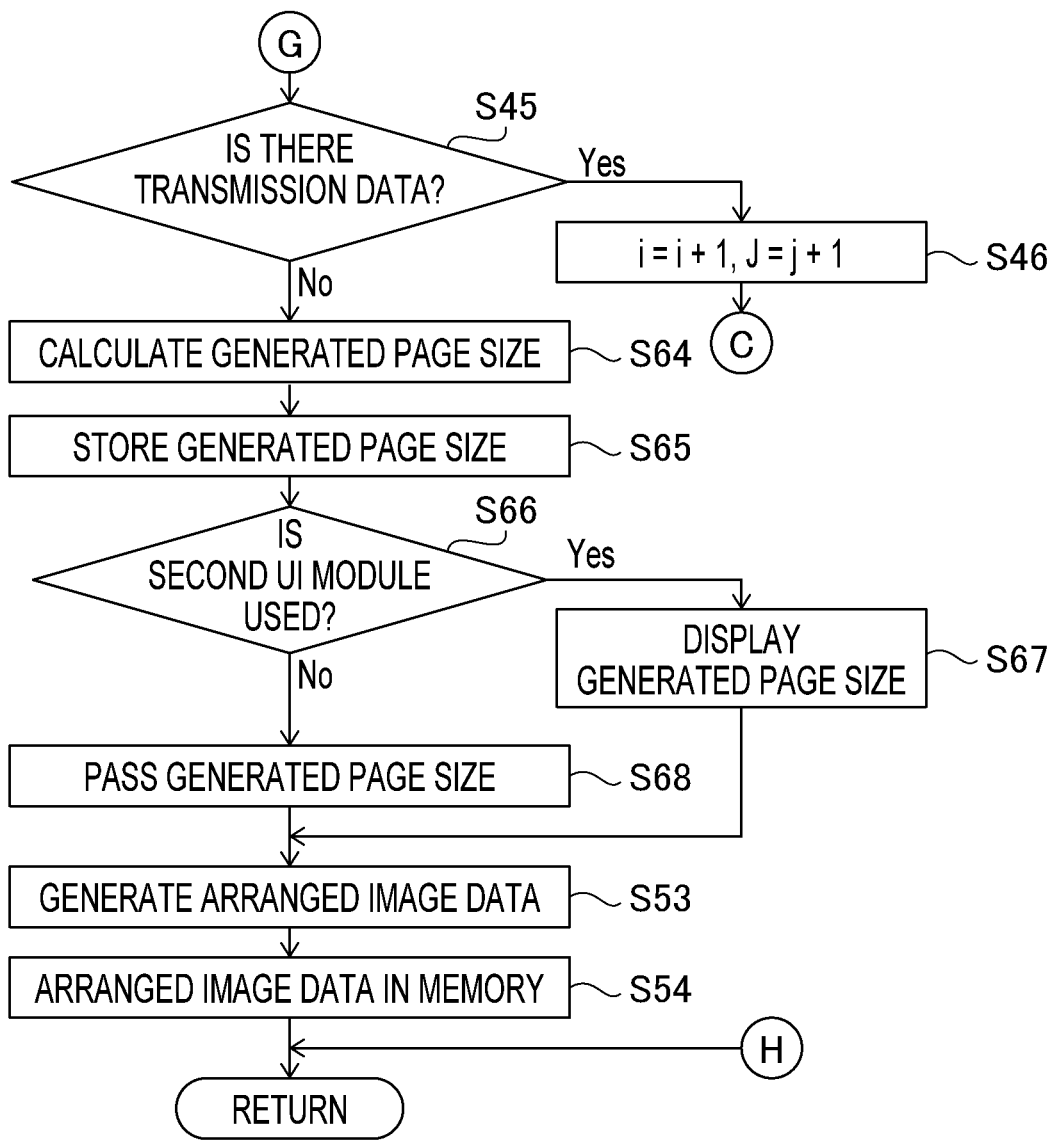

When the program 38 of the information processing device 10 determines that there is no designation of the "row size" in S22 (S22: NO), the program 38 executes the second "Nin1" process (S25). The second "Nin1" process will be described with reference to FIG. 7. It is noted that processes same as those described in the "Nin1" process are assigned with the same step numbers and description thereof will be omitted.

First, the program 38 of the information processing device 10 executes the processes from S31 to S33 described above. Then, the program 38 determines whether the "column size"

identified based on the arrangement direction information, the first page size, and the second page size obtained in the S13 is a value other than "0" (S61). When the arrangement direction information obtained in S13 indicates the "row (width direction)" and the program 38 determines that the "column size" is designated (S61: YES), the program 38 determines whether the second arranged image size obtained in S32 is less than or equal to the second page size (S62). When the program 38 determines that the arrangement direction information obtained in S13 indicates the "row (height direction)" and that the "column size" is designated (S61: YES), the program 38 determines whether the first arranged image size obtained in S32 is less than or equal to the first page size (S62). In other words, in S62, the program 38 determines whether or not the scanned image to be arranged can be arranged on the arranged page.

When the program 38 of the information processing device 10 determines that the scanned image to be arranged is cannot be arranged on the arranged page (S62: NO), the program 38 executes the S35 to S38 described above and terminates the second "Nin1" process. When the program 38 determines that the scanned image to be arranged can be arranged on the arranged page (S62: YES), the program 38 determines whether the value of "j" is "1" or not (S39). When the program 38 determines that the value of "j" is "1" (S39: YES), the program 38 executes the process of S40 and S41 described above. When the program 38 determines that the value of "j" is not "1" (S39: NO), the program 38 arranges the scanned image in the same manner as in S44 above (S63). Concretely, when the arrangement direction information obtained in S13 indicates the "row (width direction)," the program 38 arranges the scanned images to be arranged in line with the arranged images in the width direction (S63). When the arrangement direction information obtained in S13 indicates the "row (height direction)," the program 38 arranges the scanned images to be arranged side by side with the arranged images in the height direction (S63). Then, the program 38 executes the process of S45 and S46 described above.

Figure 9A:
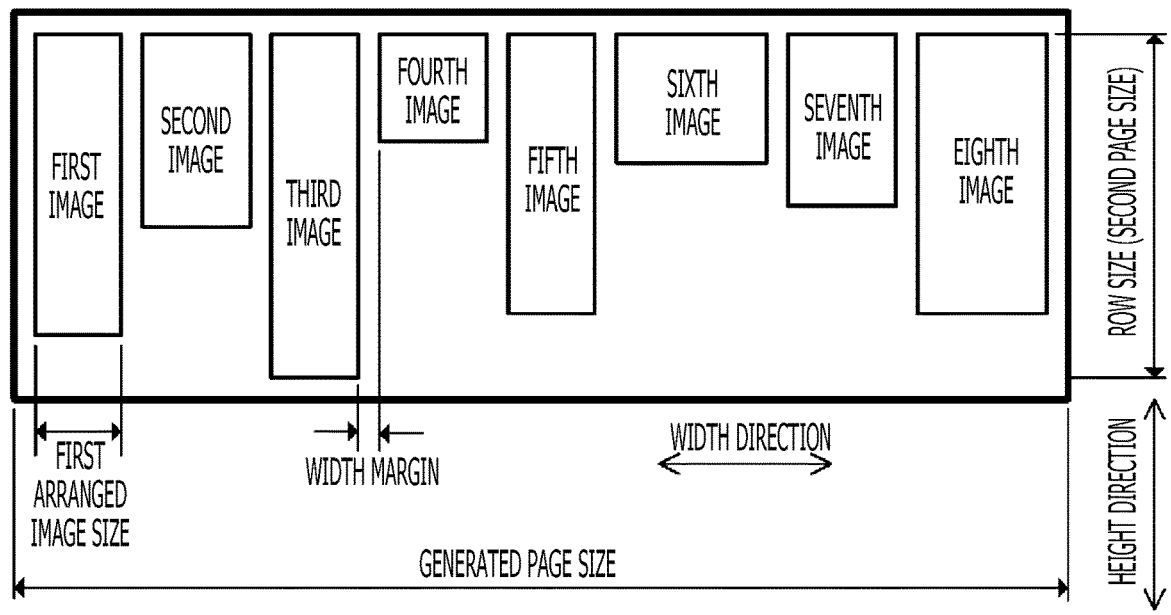
FIG. 9A shows an arrangement page where a scanned image is arranged in the second "Nin1" process.

When the program 38 of the information processing device 10 determines in S45 that there is no transmission data containing scan data to be arranged (S45: NO), the program 38 calculates the generated page size shown in FIG. 9A (S64). It is noted that FIG. 9A shows the case where the arrangement direction information obtained in S13 indicates the "row (width direction)." To describe the process of S64 in detail, the program 38 stores in the memory 32 the first arrangement image sizes of all the scanned images arranged on the arranged page in step S63. Then, the program 38 calculates the total arranged image size, which is the sum of all the first arranged image sizes stored in the memory 32. Next, the program 38 calculates the total width margin value, which is the value obtained by subtracting "1" from the number of arranged images arranged on the arranged page and multiplying the obtained value by the width margin. Then, the program 38 calculates the generated page size by summing the total arranged image value, the total width margin value, and the left and right margin sizes. The process of step S64 in which the program 38 calculates the generated page size is an example of a calculation process. The generated page size is an example of an arrangement size.

When the arrangement direction information obtained in S13 indicates the "row (height direction)," the program 38 of the information processing device 10 stores the second arranged image sizes of all the scanned images arranged on the arranged page in step S63 in the memory 32. Then, the program 38 calculates the total arranged image size, which is the sum of all the second arranged image sizes stored in the memory 32. Next, the program 38 calculates the total height margin value, which is the value obtained by subtracting "1" from the number of arranged images arranged on the arranged page and multiplying the result by an amount of the height margin. Then, the program 38 calculates the generated page size by summing the total arranged image size, the total height margin value, and the top and bottom margin sizes.

Figure 4B:
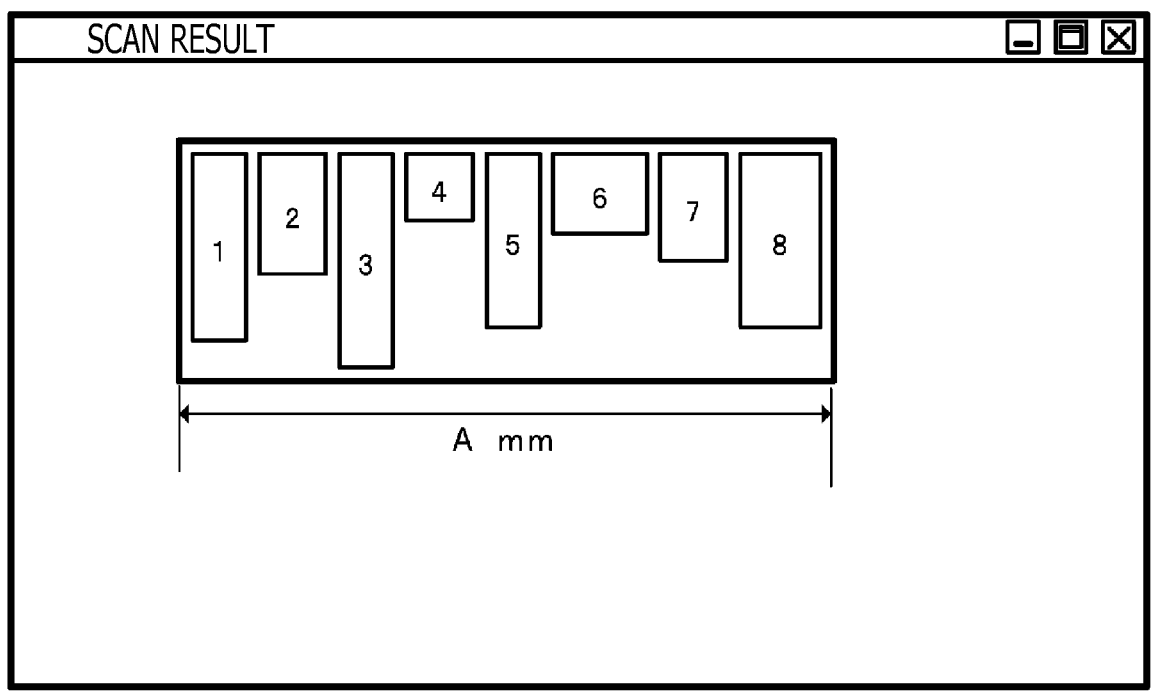
FIG. 4B shows a scan result screen.

The program 38 of the information processing device 10 stores the generated page size in the data storage area 35 of the memory 32 (S65). Then, the program 38 determines whether or not the second UI module 44 has been used in the same manner as in S36 above (S66). When the program 38 determines that the second UI module 44 has been used (S66: YES), the program 38 uses the second UI module 44 to display a scan result screen including the generated page size stored in the memory 32 on the display 24 (S67). FIG. 4B shows the scan result screen. The scan result screen has a text "Scan Result," an object indicating the generated arranged image, and the calculated generated page size ("A" in the drawing). The scan result screen makes the user aware of the scan result including the generated page size.

When the program 38 of the information processing device 10 determines that the second UI module 44 is not used (S66: NO), the program 38 passes the calculated generated page size to the external program 37 in response to the request by the external program 37 (S68). The process of S67 and S68 in which the program 38 outputs the generated page size is an example of the output process.

After execution of the process of S67 or S68, the program 38 executes the process of S53 and S54 described above, and terminates the second "Nin1" process. That is, the program 38 generates the arranged image data and stores the generated arranged image data in the memory 32. It is noted that the arranged image data may include the generated page size described above.

As shown in FIG. 2, after executing the second "Nin1" process, the program 38 of the information processing device 10 passes the file path indicating the file of the generated arranged image data or the file of the arranged image data itself to the external program 37 (S27), and terminates the process.

When the program 38 of the information processing device 10 determines that the "row size" of the arranged page is designated in S22 (S22: YES) and the "column size" is not designated in S23 (S23: NO), the program 38 executes the third "Nin1" process (S26). The third "Nin1" process will be described with reference to FIG. 8. It is noted that the processes same as those described in the first "Nin1" process and the second "Nin1" process are assigned with the same step numbers and description thereof will be omitted.

First, the program 38 of the information processing device 10 executes the processes from S31 to S33 described above. Then, the program 38 determines whether or not the scanned image obtained in S32 can be arranged on the arranged page (S71). The process of step S71 will be described in detail.

Figure 9B:
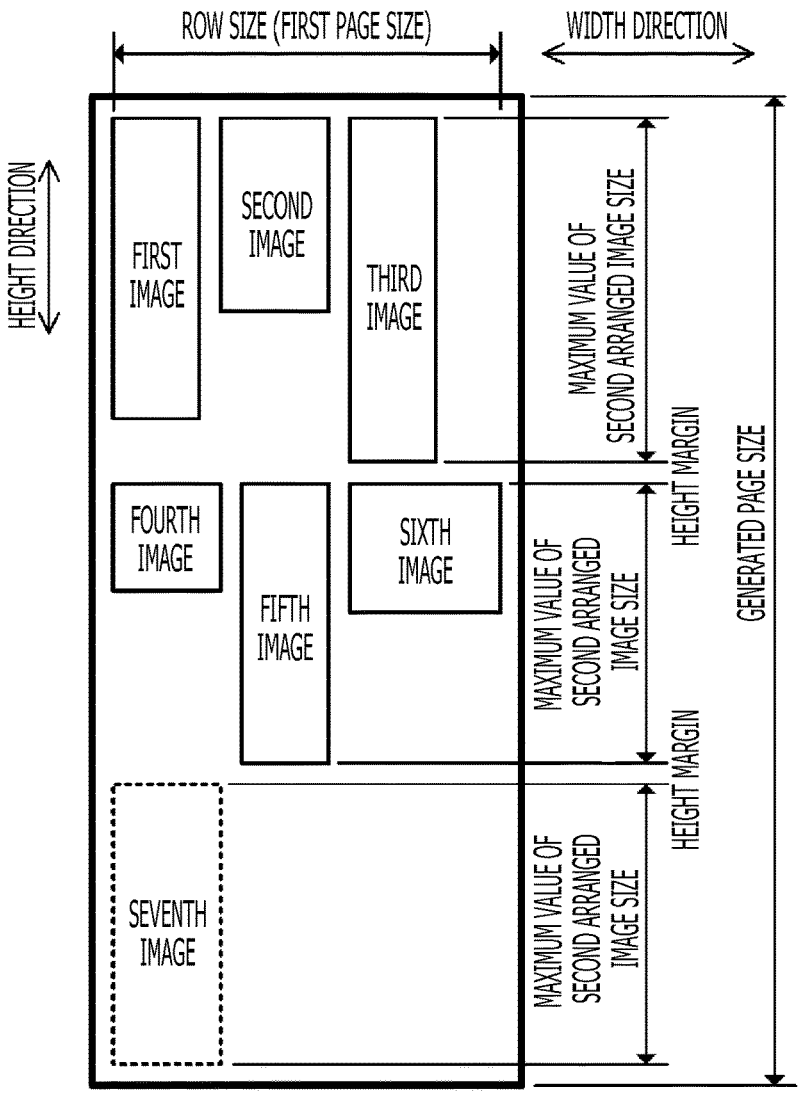
FIG. 9B shows an arrangement page where a scanned image is arranged in the third "Nin1" process.

First, a case where the arrangement direction information obtained in S13 indicates the "row (width direction)" will be explained with reference to FIG. 9B. As shown in FIG. 9B, when the arrangement direction information indicates the "row (width direction)," the "row size" is the first page size, and the "row size" is designated. The program 38 of the information processing device 10 determines that the scanned image can be arranged on the arranged page when the first arranged image size obtained in S32 is less than or equal to the first page size, which is the "row size" with the designation (S71: YES). When the first arranged image size obtained in S32 is larger than the first page size, the program 38 determines that the scanned image cannot be arranged on the arranged page (S71: NO).

Next, a case where the arrangement direction information obtained in S13 indicates the "row (height direction)." When the arrangement direction information indicates the "row (height direction)," the "row size" is the second page size. The program 38 of the information processing device 10 determines that the scanned image can be arranged on the arranged page when the second arranged image size obtained in S32 is less than or equal to the second page size (S71: YES). When the second arranged image size obtained in S32 is larger than the second page size, the program 38 determines that the scanned image cannot be arranged on the arranged page (S71: NO).

When the program 38 of the information processing device 10 determines in S71 that the scanned image cannot be arranged on the arranged page (S71: NO), the program 38 executes the processes from S35 to S38 described above, and terminates the third "Nin1" process. When the program 38 determines that the scanned image can be arranged on the arranged page (S71: YES), the program 38 determines whether or not j=1 (S39). That is, the program 38 determines whether or not the scanned image to be arranged is the first scanned image to be arranged on the arranged page.

When the program 38 of the information processing device 10 determines that j=1 (S39: YES), the program 38 arranges the scanned image using the base position obtained in S33 as the base point (S40), increments the values of "i" and "j" (S41), and executes the process from S32 onward again. When the program 38 determines that j≠1 (S39: NO), the program 38 executes the processes from S42 to S44 to perform the "row" fix process (S47). In the example shown in FIG. 9B, a "row" including the first to third images and a "row" including the fourth to sixth images are established.

Figure 8A:
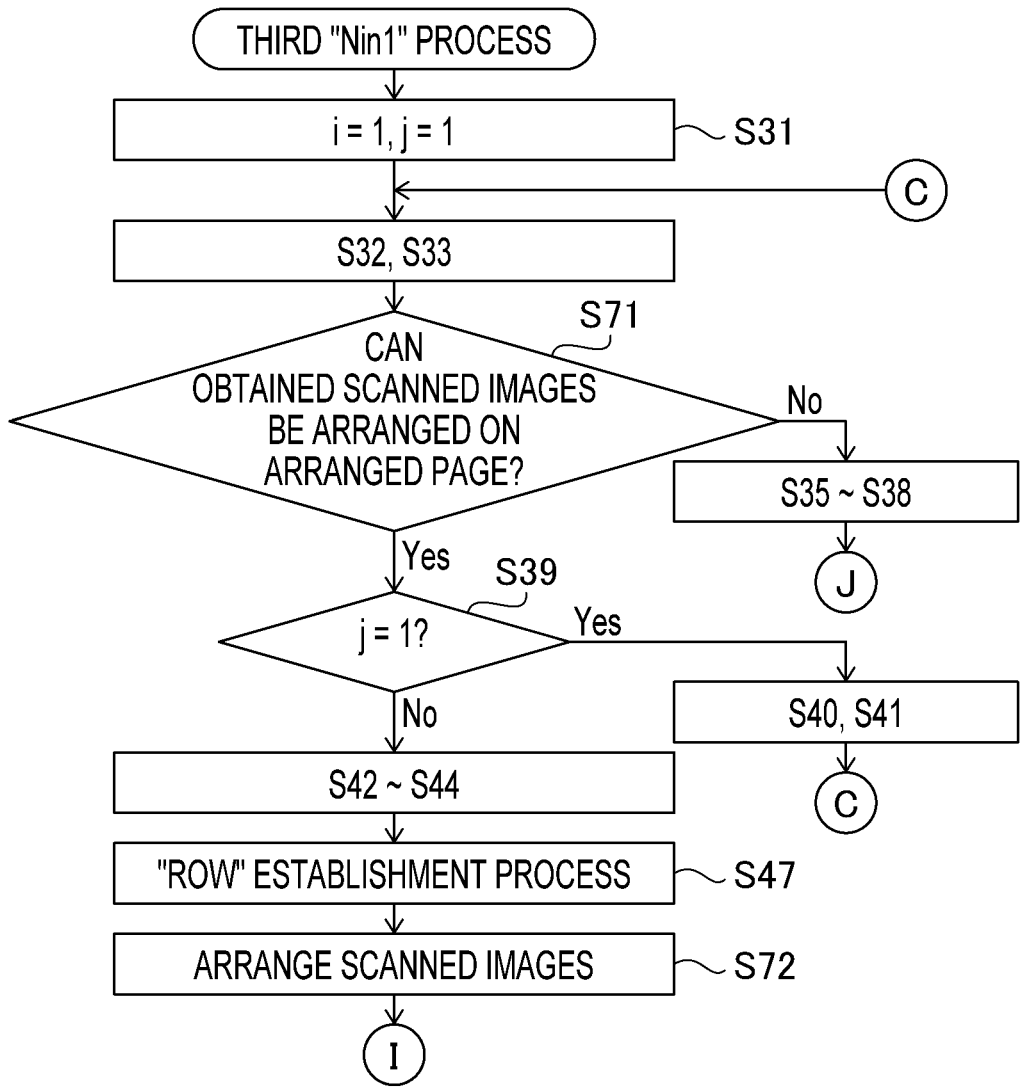
FIGS. 8A and 8B are a flowchart illustrating a third "Nin1" process.
Figure 8B:
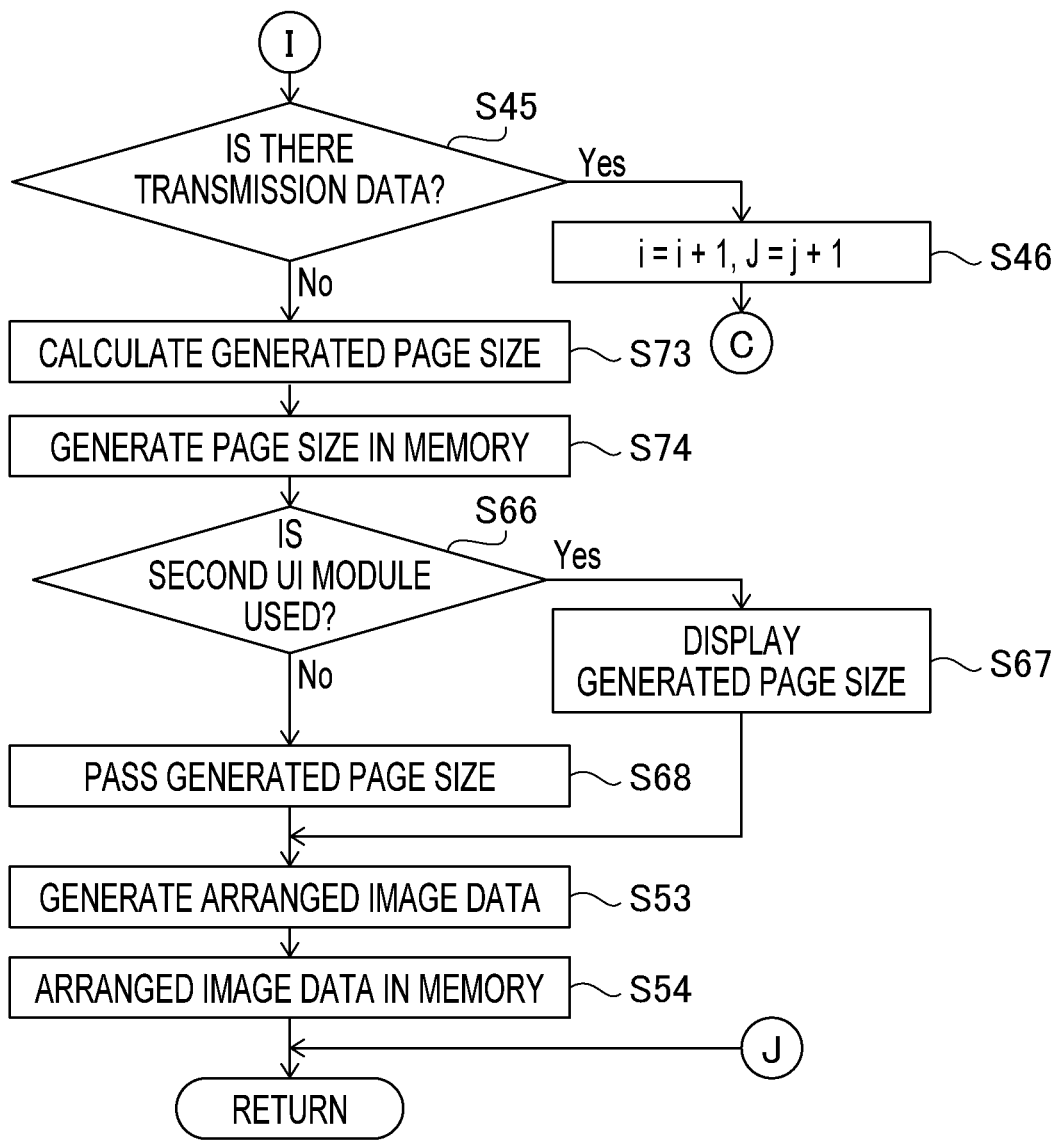

As shown in FIG. 8, after fixing the "row" (S47), the program 38 of the information processing device 10 arranges the scanned image to be arranged on the arranged page (S72). The process of S72 is performed in the same way as the process of S49 described above. In the example shown in FIG. 9B, in the process of S72, the seventh image is arranged below the "row" containing the fourth through sixth images.

After execution of the process of S72, the program 38 of the information processing device 10 executes the process of S45 described above. When the program 38 determines in S45 that there is no transmission data containing scanned image data to be arranged (S45: NO), the program 38 calculates the generated page size shown in FIG. 9B (S73). The process of S73, which is executed when the arrangement direction information obtained in S13 indicates the "row (width direction)," is described with reference to FIG. 9B. Each time a scanned image is arranged on the arranged page, the program 38 determines whether the second arranged image size of the arranged scanned image is larger than the second arranged image size stored in the memory 32. When it is determined that the second arranged image size of the arranged scanned image is larger than the second arranged image size stored in the memory 32, the program 38 overwrites the second arranged image size of the arranged scanned image with the second arranged image size stored in the memory 32. In other words, the program 38 stores the maximum value of the second arranged image size of the arranged scanned images in the memory 32. Further, the program 38 executes the process of storing the maximum value of the second arranged image size in the memory 32 for each "row" to be fixed in S47. In other words, the program 38 stores the maximum value of the second arranged image size in the memory 32 for each "row" to be fixed. In the example shown in FIG. 9B, the second arranged image size of the third image, the second arranged image size of the fifth image, and the second arranged image size of the seventh image are stored in the memory 32.

The program 38 calculates the total arranged image size, which is the sum of the maximum values of all the second arranged image sizes stored in the memory 32. Next, the program 38 calculates the total height margin value, which is the value obtained by subtracting "1" from the number of fixed "rows" and multiplying the same by an amount of the height margin. In the example shown in FIG. 9B, the program 38 calculates the total height margin value by subtracting "1" from the number of fixed "rows" "3" and multiplying the results by the amount of the height margin "2." The program 38 then calculates the generated page size by summing the calculated total arranged image size, the calculated total height margin value, and the top and bottom margin sizes.

Figure 10B:
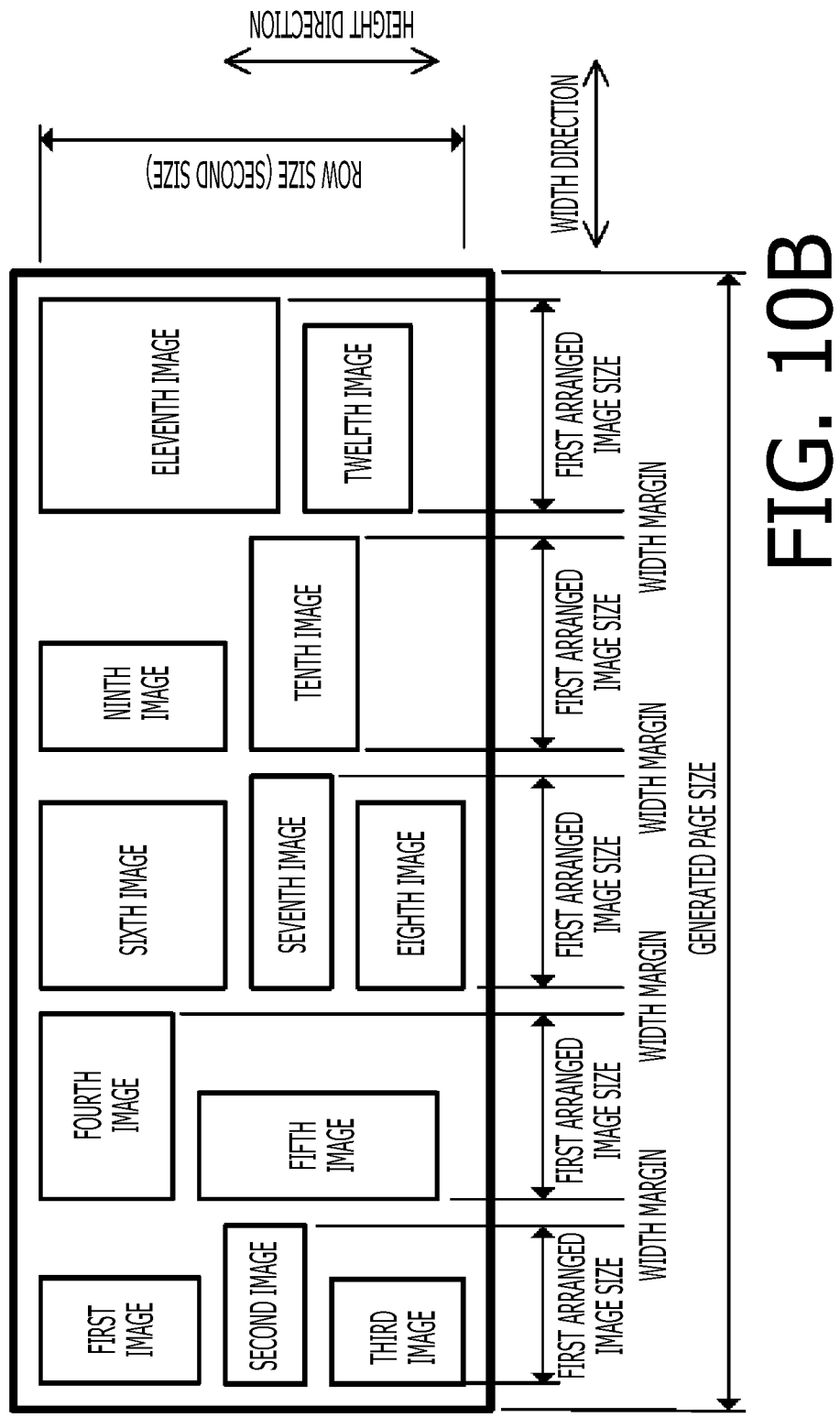
FIG. 10B shows an arrangement page generated when the radio button is selected and "0" is entered in a text box on the setting screen.

FIG. 10B shows the arranged page generated when the arrangement direction information obtained in S13 indicates the "row (height direction)." Concretely, FIG. 10B shows the arranged page generated when the radio button 88 is selected and "0" is entered in the text box 80 in the setting screen (FIG. 10A). The program 38 of the information processing device 10 calculates the generated page size in the same manner as described above when the arrangement direction information obtained in S13 indicates the "row (height direction).

The program 38 of the information processing device 10 stores the generated page size in the data storage area 35 of the memory 32 (S74). Then, the program 38 executes the processes of S66 to S68 and the processes of S53 and S54 in the same manner as the second "Nin1" process described above, and terminates the third "Nin1" process. The arranged image data generated in S53 may include the generated page size calculated in S73.

After executing the third "Nin1" process (S26), as shown in FIG. 2, the program 38 of the information processing device 10 passes the file path indicating the file of the generated arranged image data or the file of the arranged image data itself to the external program 37 (S27), and terminates the process.

Effects

The program 38 generates the arranged image data by arranging the plurality of scanned images on the arranged page. That is, the program 38 generates the arranged image data by arranging the plurality of scanned images in the direction indicated by the "row" and on the arranged page of the size designated by the user as much as possible, instead of arranging the N images designated by the user in equally divided areas of a page. Thus, the program 38 can generate the arranged image data with multiple images arranged without being limited to arrangement in equally divided areas.

When the program 38 determines that the scanned images cannot be arranged in the direction indicated by the "rows" (S42: NO), the program 38 arranges the scanned images in the direction indicated by the "columns" (S49). Thus, the program 38 can place more scanned images on the arranged page than in a case where the scanned images are not arranged in the direction indicated by the "row."

Further, the program 38 obtains the width margin and the height margin designated by the user (S13), and arranges the scanned images on the arranged page such that the scanned images are separated from each other by the obtained amounts of the width and height margins. Thus, the program 38 can, for example, generate the arranged image data with the width and height margins designated by the customs agency. As a result, the program 38 can generate the arranged image data that the user desires and that can be submitted, for example, to the customs agency.

Further, the program 38 arranges the scanned images such that the scanned images are arranged below or to the right with respect to the bottom or right edge of the arranged image having the largest height or width among the plurality of arranged images included in the fixed "row." Thus, the program 38 is able to place the scanned images on the arranged page so that the scanned images do not overlap each other.

When the program 38 determines that a scanned image cannot be arranged on the arranged page (S42: NO; S48: NO), the program 38 fixes the page (S52) and arranges the scanned image, which cannot be arranged in the arranged page, on the next arranged page (S40). Thus, the program 38 can generate the arranged image data by arranging all the scanned images generated by the scanner 55 on the arranged pages.

The program 38 obtains the arrangement direction information indicating whether the user has selected the radio button 87 or the radio button 88 in the setting screen, determines whether the direction indicated by the "row" should be the width direction or the height direction based on the obtained arrangement direction information, and arranges the scanned images on the arranged page. Since the program 38 arranges the scanned images on the arranged page in the arrangement direction desired by the user, the program 38 can generate the arranged image data that meets the user's desired can be submitted to, for example, a customs agency.

Since the program 38 has a second UI module 44, the program 38 can obtain the first or second page size of the arranged pages through the first UI module 42 of the external program 37, or obtain the first or second page size of the arranged pages through the second UI module 44 of the program 38 itself.

When the size of the scanned image to be arranged is a size that cannot be arranged on the arranged page (S34: NO), and when the program 38 determines that the second UI module 44 of the program 38 itself is being used (S36: YES), the program 38 uses the second UI module 44 to display an error screen on the display 24 (S37). Thus, the program 38 can make the user aware that the size of the scanned original document or the size of the arranged page designated by the user is inappropriate.

When the program 38 determines that the user has not designated the "row size," the program 38 performs the second "Nin1" process of arranging the scanned images in the direction indicated by the "row." Then, in the second "Nin1" process, the program 38 calculates the generated page size of the generated arranged image data and displays the calculated generated page size on the display 24. Thus, the program 38 can generate one arranged image data by arranging all the scanned images in the direction indicated by the "row," when the user has not designated the "row size." Further, by calculating the generated page size, the program 38 can make the user aware of the size of the generated arranged image data and in the direction indicated by the "row."

When the program 38 determines that the user has not designated the "column size" of the arranged page, the program 38 performs the third "Nin1" process. By performing the third "Nin1" process, the program 38 can generate a single arranged image data in which a plurality of scanned images are arranged. Further, the program 38 calculates the generated page size and displays the calculated generated page size on the display 24. Thus, the program 38 can make the user aware of the size of the generated arranged image data and in the direction indicated by the "column."

First Modification

In the above-described embodiment, an example is described in which the program 38 of the information processing device 10 generates the arranged image data by arranging a plurality of scanned images on the arranged page. However, the program 38 may generate the arranged image data by arranging a plurality of images indicated by the image data other than the scanned image data, such as a plurality of image data indicating photographed images, on the arranged page as much as possible.

Second Modification

In the above-described embodiment, an example in which the program 38 generates and outputs the arranged image data for one page as a single file is described. However, the program 38 may be configured to output the arranged image data for a plurality of pages as a single file. Alternatively, the program 38 may be configured to obtain designation of the data format of the arranged image data to be output through the external program 37 or the second UI module 44, and output the arranged image data in the obtained data format. The data format may include various formats such as a binary format, a file format, a PDF format, an HTML format, and the like.

Third Modification

In the above-described embodiment, an example in which the program 38 arranges the plurality of scanned images in the direction indicated by the "row," and when it is determined that the scanned images cannot be arranged in the direction indicated by the "row" (S42: NO), the program 38 arranges the scanned images in the direction indicated by the "column" (S49). It is noted that the program 38 may be configured to arrange the plurality of scanned images only in the direction indicated by the "row".

What is claimed is:

1. A non-transitory computer-readable recording medium for an information processing device which includes a memory and a computer, the recording medium containing computer-executable instructions which cause, when executed by the computer, the information processing device to perform:

a first obtaining process of obtaining a plurality of pieces of image data;

a second obtaining process of obtaining an area size from an external program, the area size being a size of an arrangement area in which obtained images represented by the obtained plurality of pieces of image data are to be arranged;

when the obtained images are arranged without overlapping arranged images which are the obtained images having already been arranged within the arrangement area and when the obtained images are arranged, with respect to the arranged images, in a first arrangement direction stored in the memory, a first determining process of determining whether the obtained images to be arranged within the arrangement area are appropriately arranged;

in response to determining, in the first determining process, that the obtained images are arranged appropriately, a first arranging process of arranging the obtained images in the first direction with respect to the arranged images without overlapping the arranged images; and a generating process of generating arranged image data representing the plurality of arranged images arranged in the arrangement area.

2. The non-transitory computer-readable recording medium according to claim 1, wherein the instructions further cause, when executed by the computer, the information processing device to perform:

in response to determining, in the first determining, that the obtained images cannot be arranged appropriately, a second arranging process of arranging the obtained images such that the obtained images do not overlap the arranged images and are arranged, with respect to the arranged images, in a second arrangement direction stored in the memory, the second arrangement direction being different from the first arrangement direction; and the first determining and the first arranging with respect to the obtained images to be arranged in the second arranging process.

3. The non-transitory computer-readable recording medium according to claim 1, wherein, in response to determining, in the first determining, that the obtained images cannot be arranged appropriately, when the obtained images are to be arranged, with respect to the arranged images, on a second arrangement direction without overlapping the arranged images, the second arrangement direction being stored in the memory, the second arrangement direction being different from the first arrangement direction the instructions further cause, when executed by the computer, the information processing device to perform:

a second determining process of determining whether the obtained images to be arranged can be appropriately arranged so that the obtained images is arranged within the arrangement area; and the second arranging process of arranging in response to determining, in the second determining process, that the obtained images is to be appropriately arranged.

4. The non-transitory computer-readable recording medium according to claim 2, wherein, in the first determining process, the information processing device performs:

a first process of obtaining a first total size which is a sum of sizes, in the first arrangement direction, of the plurality of arranged images arranged in the first arrangement direction; and a second process of determining whether the obtained images is to be appropriately arranged based on the first total size as obtained, a first arranged image size that is a size, in the first arrangement direction, of the size of the obtained images to be arranged and a first area size that is a size, in the first arrangement direction, of the area size.

5. The non-transitory computer-readable recording medium according to claim 4, wherein, in the first determining process, the information processing device perform:

a third process of obtaining a first total separation size based on first separation sizes stored in the memory and a number of arranged images arranged in the first arrangement direction, the first separation sizes representing separation sizes between adjacent two of the arranged images arranged in the first arrangement direction, respectively; and wherein the second process, the information processing device determines whether the obtained images is to be appropriately arranged based on the first total size, the first arranged image size, the first area size and the first total separation size.

6. The non-transitory computer-readable recording medium according to claim 3, wherein, in the second determining process, the information processing device perform:

a fourth process of obtaining a second page size of a particular arranged image as a particular second page size, the particular arranged image being one of the plurality of arranged images arranged in the first arrangement direction, the particular arranged image having a largest second page size which is a size in the second arrangement direction among the plurality of arranged images arranged in the first arrangement direction;

a fifth process of obtaining a second total size that is a sum of the particular second page sizes in the second arrangement direction; and a sixth process of determining whether the obtained images to be arranged is appropriately arranged based on the obtained second total size, second image sizes which are sizes of the obtained images to be arranged in the second arrangement direction, and a second area size representing a size of the area size in the second arrangement direction.

7. The non-transitory computer-readable recording medium according to claim 6, wherein, in the second determining process, the information processing device performs:

based on second separation sizes stored in the memory and representing distances between adjacent two of the particular arranged images in the second arrangement direction and a number of the particular arranged images in the second arrangement direction, a seventh obtaining process of obtaining a second total separation size representing a total size of the second separation sizes, and wherein, in the sixth process, the information processing device determines whether the obtained images to be arranged is appropriately arranged based on the second total size, the second arranged image sizes, the second area size and the second total separation size.

8. The non-transitory computer-readable recording medium according to claim 4, wherein the first arranging process includes arranging the obtained image firstly obtained based on a base position stored in the memory and indicating a position in the arrangement area.

9. The non-transitory computer-readable recording medium according to claim 7, wherein in the first arranging process includes arranging the obtained image firstly obtained based on a base position stored in the memory and indicating a position in the arrangement area, the base position including a first base position and a second base position, the first base position indicating a position in the arrangement area in the first arrangement direction, a second base position indicating a position in the arrangement area in the second arrangement direction, and wherein, in the second arranging process, the information processing device performs:

arranging the obtained images based on a third base position and the first base position, the third base position being a position separated from a position of an end of the particular arranged image in the second arrangement direction by an amount of the second separation size.

10. The non-transitory computer-readable recording medium according to claim 3,
wherein in response to a determining, in the second determining process, that the obtained images cannot be arranged appropriately, the information processing device performs a third arranging process of arranging the obtained images to be arranged in a next one arrangement area.

11. The non-transitory computer-readable recording medium according to claim 4,
wherein the instructions further cause, when executed by the computer, the information processing device to perform a storing process including:
receiving arrangement direction information through a user interface of the information processing device, the arrangement direction information determining the first arrangement direction; and
storing the received arrangement direction information in the memory.

12. The non-transitory computer-readable recording medium according to claim 4,
wherein the instructions further cause, when executed by the computer, the information processing device to perform an outputting process of outputting the generated arranged image data as a single-file data.

13. The non-transitory computer-readable recording medium according to claim 4,
wherein the instructions further cause, when executed by the computer, the information processing device to perform:
a displaying process of displaying an input screen on a display provided to the information processing device;
a receiving process of receiving the area size through the input screen; and
a third obtaining of obtaining the area size received through the input screen.

14. The non-transitory computer-readable recording medium according to claim 13,
wherein the instructions further cause, when executed by the computer, the information processing device to perform:
a fourth obtaining process of obtaining a first arranged image size representing a size of the obtained image in the first arrangement direction and a second arranged image size representing a size of the obtained image in the second arrangement direction;
a size determining process:
determining whether the obtained first arrangement image size is greater than a first area size representing the area size in the first arrangement direction, the first area being the area size obtained in the third obtaining process; and
determining whether the obtained second arrangement image size is greater than the second area size representing the area size in the second arrangement direction, the second area size being the area size obtained in the third obtaining; and
in response to one of the first arranged image size being greater than the first area size and the second arranged image size being greater than the second area size, an error displaying process of displaying an error screen on the display.

15. The non-transitory computer-readable recording medium according to claim 1,
wherein the first obtaining process includes obtaining a plurality of pieces of the image data that the information processing device receives from the scanner through a communication interface provided to the information processing device.

16. A non-transitory computer-readable recording medium for an information processing device which includes a memory and a computer, the recording medium containing computer-executable instructions which cause, when executed by the computer, the information processing device to perform:
a first obtaining process of obtaining a plurality of pieces of image data;
a first arranging process of arranging obtained images represented by the obtained plurality of pieces of image data in an arrangement area such that the obtained images do not overlap arranged images which are obtained images having been arranged in the arrangement area, and the obtained images are arranged in a first arrangement direction stored in the memory with respect to the arranged images;
a generating process of generating arranged image data representing the plurality of arranged images arranged in the arrangement area;
a calculating process of calculating an arrangement size representing a size of the arranged image data in the first arrangement direction based on the generated arranged image data; and
an outputting process of outputting the calculated arrangement size and the generated arranged image data.

17. The non-transitory computer-readable recording medium according to claim 16,
wherein the first arranging process includes arranging the obtained images to be arranged with respect to the arranged images by an amount of a separation size stored in the memory in the first arrangement direction.

18. The non-transitory computer-readable recording medium according to claim 16,
wherein the instructions further cause, when executed by the computer, the information processing device to perform:
a second obtaining process of obtaining a first area size representing a size of the arrangement area in the first arrangement direction from an external program;
when arranging the obtained images as obtained in the first arrangement direction with respect to the arranged images, a first determining process of determining whether the obtained images to be arranged is appropriately arranged so as to be arranged within the arrangement area;
the first arranging process performed in response to determining that the obtained images are appropriately arranged;
in response to determining, in the first determining process, that the obtained images cannot be arranged appropriately, a second determining process of determining whether the obtained images is to be arranged appropriately so as to be arranged within the arrangement area when the obtained images are arranged in a second arrangement direction stored in the memory and different from the first arrangement direction with respect to the arranged images without overlapping the arranged images;

in response to determining, in the second determining process, that the obtained images is to be arranged appropriately, a second arranging process of arranging the obtained images in the second arrangement direction with respect to the arranged images so as not overlap the arranged images; and the first determining and the first arranging for the obtained images arranged in the second arranging process.

\* \* \* \* \*

UNITED STATES PATENT AND TRADEMARK OFFICE
CERTIFICATE OF CORRECTION

| | | |
|---|---|---|
| PATENT NO. | : 11,641,432 B2 | Page 1 of 3 |
| APPLICATION NO. | : 17/644358 | |
| DATED | : May 2, 2023 | |
| INVENTOR(S) | : Lei Li, Kenju Narita and Hiroya Nojiri | |

It is certified that error appears in the above-identified patent and that said Letters Patent is hereby corrected as shown below:

In the Claims

Claim 1, Column 27, Line 4:
Please change: "images in the first direction with respect to the arranged" to -- images in the first arrangement direction with respect to the arranged --

Claim 1, Column 27, Line 7:
Please change: "representing the plurality of arranged images arranged" to -- representing a plurality of arranged images arranged --

Claim 2, Column 27, Line 14:
Please change: "in response to determining, in the first determining, that" to -- in response to determining, in the first determining process, that --

Claim 2, Column 27, Line 22:
Please change: "the first determining and the first arranging with respect to" to -- the first determining process and the first arranging process with respect to --

Claim 3, Column 27, Lines 27-29:
Please change: "wherein, in response to determining, in the first determining, that the obtained images cannot be arranged appropriately, when the obtained images are to be arranged," to -- wherein, in response to determining, in the first determining process, that the obtained images cannot be arranged appropriately, when the obtained images are to be arranged, --

Claim 3, Column 27, Line 30:
Please change: "with respect to the arranged images, on a second" to -- with respect to the arranged images, in a second --

Claim 3, Column 27, Line 35:
Please change: "direction the instructions further cause, when executed" to -- direction, the Signed and Sealed this
Fourteenth Day of November, 2023

Katherine Kelly Vidal
*Director of the United States Patent and Trademark Office*

CERTIFICATE OF CORRECTION (continued)
U.S. Pat. No. 11,641,432 B2 instructions further cause, when executed --

Claim 3, Column 27, Line 40:
Please change: "arranged so that the obtained images is arranged within" to -- arranged so that the obtained images are arranged within --

Claim 3, Column 27, Line 42:
Please change: "the second arranging process of arranging in response to" to -- a second arranging process of arranging in response to --

Claim 3, Column 27, Line 44:
Please change: "the obtained images is to be appropriately arranged." to -- the obtained images are to be appropriately arranged. --

Claim 4, Column 27, Line 54:
Please change: "images is to be appropriately arranged based on the" to -- images are to be appropriately arranged based on the --

Claim 5, Column 28, Lines 4-5:
Please change: "wherein the second process, the information processing device determines whether the obtained images is to be" to -- wherein in the second process, the information processing device determines whether the obtained images are to be --

Claim 6, Column 28, Line 26:
Please change: "images to be arranged is appropriately arranged" to -- images to be arranged are appropriately arranged --

Claim 7, Column 28, Lines 40-41:
Please change: "arranged images in the second arrangement direction, a seventh obtaining process of obtaining a" to -- arranged images in the second arrangement direction, a seventh process of obtaining a --

Claim 7, Column 28, Line 46:
Please change: "arranged is appropriately arranged based on the second" to -- arranged are appropriately arranged based on the second --

Claim 9, Column 28, Line 57:
Please change: "wherein in the first arranging process includes arranging" to -- wherein the first arranging process includes arranging --

Claim 9, Column 28, Line 63:
Please change: "area in the first arrangement direction, a second base" to -- area in the first arrangement direction, the second base --

Claim 13, Column 29, Line 42:
Please change: "a third obtaining of obtaining the area size received" to -- a third obtaining process of obtaining the area size received --

Claim 14, Column 29, Line 54:
Please change: "a size determining process:" to -- a size determining process including: --

Claim 14, Column 29, Line 64:
Please change: "the area size obtained in the third obtaining; and" to -- the area size obtained in the third obtaining process; and --

Claim 18, Column 30, Lines 52-53:
Please change: "whether the obtained images to be arranged is appropriately arranged so as to be arranged within the" to -- whether the obtained images to be arranged are appropriately arranged so as to be arranged within the --

Claim 18, Column 30, Lines 60-61:
Please change: "appropriately, a second determining process of determining whether the obtained images is to be arranged" to -- appropriately, a second determining process of determining whether the obtained images are to be arranged --

Claim 18, Column 31, Line 2:
Please change: "process, that the obtained images is to be arranged" to -- process, that the obtained images are to be arranged --

Claim 18, Column 31, Line 7:
Please change: "the first determining and the first arranging for the" to -- the first determining process and the first arranging process for the --